US010198719B2

(12) United States Patent
Collins et al.

(10) Patent No.: US 10,198,719 B2
(45) Date of Patent: Feb. 5, 2019

(54) SOFTWARE, SYSTEMS, AND METHODS FOR PROCESSING DIGITAL BEARER INSTRUMENTS

(71) Applicant: API Market, Inc., San Mateo, CA (US)

(72) Inventors: Kevin Collins, Redwood City, CA (US); Richard C. Haven, Capitola, CA (US); Eric Kintzer, Menlo Park, CA (US); Jeremy Olsen, San Jose, CA (US); Stefan Roever, Redwood City, CA (US); Shannon Thrasher, Campbell, CA (US); Rhandee Leano, Emeryville, CA (US); Brian OKelley, Emeryville, CA (US)

(73) Assignee: API Market, Inc., San Mateo, CA (US)

( * ) Notice: Subject to any disclaimer, the term of this patent is extended or adjusted under 35 U.S.C. 154(b) by 0 days.

(21) Appl. No.: 14/831,713

(22) Filed: Aug. 20, 2015

(65) Prior Publication Data

US 2016/0048812 A1    Feb. 18, 2016

Related U.S. Application Data

(63) Continuation of application No. 11/645,139, filed on Dec. 22, 2006, now Pat. No. 9,177,338.
(Continued)

(51) Int. Cl.
*G06Q 20/08* (2012.01)
*G06F 21/10* (2013.01)
(Continued)

(52) U.S. Cl.
CPC ........... *G06Q 20/085* (2013.01); *G06F 21/10* (2013.01); *G06F 21/57* (2013.01); *G06Q 10/00* (2013.01);
(Continued)

(58) Field of Classification Search
CPC .................................................. G06Q 20/085
(Continued)

(56) References Cited

U.S. PATENT DOCUMENTS 5,063,507 A    11/1991    Lindsey
5,455,407 A    10/1995    Rosen
(Continued)

FOREIGN PATENT DOCUMENTS

JP    02-245970    1/1990
JP    2001-338242 A    12/2001
(Continued)

OTHER PUBLICATIONS

U.S. Final Office Action dated Nov. 17, 2016 issued in U.S. Appl. No. 14/245,885.
(Continued)

*Primary Examiner* — Jamie R Kucab
(74) *Attorney, Agent, or Firm* — Weaver Austin Villeneuve & Sampson LLP

(57) ABSTRACT

Methods and apparatus are described which enable flexible and secure processing of digital bearer instruments. An architecture is provided that enables provision of an extensible applications framework that flexibly supports a variety of features and functionality supporting title-based rights processing operations. A wide range of methods of defining and assuring rights processing operating environments extend the capabilities of rights processing operating environments in a variety of ways.

26 Claims, 6 Drawing Sheets

Related U.S. Application Data

(60) Provisional application No. 60/765,388, filed on Feb. 2, 2006, provisional application No. 60/755,750, filed on Dec. 29, 2005.

(51) Int. Cl.
  *G06F 21/57*      (2013.01)
  *G06Q 10/00*      (2012.01)
  *G06Q 30/00*      (2012.01)
  *H04N 7/173*      (2011.01)
  *H04N 21/4627*    (2011.01)
  *H04N 21/472*     (2011.01)
  *H04N 21/478*     (2011.01)
  *H04N 21/8355*    (2011.01)
  *G06Q 20/40*      (2012.01)

(52) U.S. Cl.
  CPC ............ *G06Q 20/40* (2013.01); *G06Q 30/00* (2013.01); *H04N 7/17318* (2013.01); *H04N 21/4627* (2013.01); *H04N 21/47202* (2013.01); *H04N 21/47815* (2013.01); *H04N 21/8355* (2013.01)

(58) Field of Classification Search
  USPC .......................................................... 705/59
  See application file for complete search history.

(56) References Cited

U.S. PATENT DOCUMENTS

| | | |
|---|---|---|
| 5,606,609 A | 2/1997 | Houser et al. |
| 5,629,980 A | 5/1997 | Stefik et al. |
| 5,752,020 A | 5/1998 | Ando |
| 5,778,182 A | 7/1998 | Cathey et al. |
| 5,794,217 A | 8/1998 | Allen |
| 5,812,670 A | 9/1998 | Micali |
| 5,828,751 A | 10/1998 | Walker |
| 5,892,900 A | 4/1999 | Ginter et al. |
| 5,903,880 A | 5/1999 | Biffar |
| 5,905,976 A | 5/1999 | Mjolsnes et al. |
| 5,941,947 A | 8/1999 | Brown et al. |
| 5,956,736 A | 9/1999 | Hanson |
| 6,065,117 A | 5/2000 | White |
| 6,070,171 A | 5/2000 | Snyder et al. |
| 6,078,909 A | 6/2000 | Knutson |
| 6,098,056 A | 8/2000 | Rusnak et al. |
| 6,119,229 A | 9/2000 | Martinez et al. |
| 6,141,006 A | 10/2000 | Knowlton |
| 6,154,214 A | 11/2000 | Uyehara et al. |
| 6,170,744 B1 | 1/2001 | Lee et al. |
| 6,189,097 B1 | 2/2001 | Tycksen, Jr. |
| 6,205,436 B1 | 3/2001 | Rosen et al. |
| 6,212,504 B1 | 4/2001 | Hayosh |
| 6,292,788 B1 | 9/2001 | Roberts et al. |
| 6,327,578 B1 | 12/2001 | Linehan |
| 6,330,544 B1 | 12/2001 | Walker et al. |
| 6,341,353 B1 | 1/2002 | Herman et al. |
| 6,360,254 B1 | 3/2002 | Linden et al. |
| 6,372,974 B1 | 4/2002 | Gross et al. |
| 6,378,075 B1 | 4/2002 | Goldstein et al. |
| 6,389,541 B1 | 5/2002 | Patterson |
| 6,519,573 B1 | 2/2003 | Shade et al. |
| 6,574,609 B1 | 6/2003 | Downs |
| 6,578,078 B1 | 6/2003 | Smith et al. |
| 6,587,867 B1 | 7/2003 | Miller et al. |
| 6,591,260 B1 | 7/2003 | Schwarzhoff et al. |
| 6,600,823 B1 | 7/2003 | Hayosh |
| 6,629,081 B1 | 9/2003 | Cornelius et al. |
| 6,662,340 B2 | 12/2003 | Rawat et al. |
| 6,675,153 B1 | 1/2004 | Cook et al. |
| 6,751,670 B1 | 6/2004 | Patterson |
| 6,772,341 B1 | 8/2004 | Shrader et al. |
| 6,820,204 B1 | 11/2004 | Desai et al. |
| 6,842,741 B1 | 1/2005 | Fujimura |
| 6,868,392 B1 | 3/2005 | Ogasawara |
| 6,871,220 B1 | 3/2005 | Rajan et al. |
| 6,895,392 B2 | 5/2005 | Stefik et al. |
| 6,898,576 B2 | 5/2005 | Stefik et al. |
| 6,910,179 B1 | 6/2005 | Pennell et al. |
| 6,913,193 B1 | 7/2005 | Kawan |
| 6,920,567 B1 | 7/2005 | Doherty et al. |
| 6,925,439 B1 | 8/2005 | Pitroda |
| 6,938,021 B2 | 8/2005 | Shear et al. |
| 6,941,291 B1 | 9/2005 | Zoller et al. |
| 6,944,776 B1 | 9/2005 | Lockhart et al. |
| 6,947,556 B1 | 9/2005 | Matyas et al. |
| 6,947,571 B1 | 9/2005 | Rhoads et al. |
| 7,003,670 B2 | 2/2006 | Heavan et al. |
| 7,010,512 B1 | 3/2006 | Gillin |
| 7,016,877 B1 | 3/2006 | Steele et al. |
| 7,020,626 B1 | 3/2006 | Eng et al. |
| 7,028,009 B2 | 4/2006 | Wang et al. |
| 7,069,234 B1 | 6/2006 | Cornelius et al. |
| 7,069,310 B1 | 6/2006 | Bartholomew |
| 7,099,849 B1 | 8/2006 | Reeder et al. |
| 7,103,574 B1 | 9/2006 | Peinado et al. |
| 7,120,606 B1 | 10/2006 | Ranzini et al. |
| 7,130,829 B2 | 10/2006 | Banerjee et al. |
| 7,191,332 B1 | 3/2007 | Pankajakshan et al. |
| 7,249,107 B2 | 7/2007 | Yaacovi |
| 7,275,260 B2 | 9/2007 | de Jong et al. |
| 7,318,049 B2 | 1/2008 | Iannacci |
| 7,346,923 B2 | 3/2008 | Atkins |
| 7,392,226 B1 | 6/2008 | Sasaki et al. |
| 7,401,221 B2 | 7/2008 | Adent et al. |
| 7,424,747 B2 | 9/2008 | DeTreville |
| 7,426,492 B1 | 9/2008 | Bishop et al. |
| 7,444,519 B2 | 10/2008 | Laferriere et al. |
| 7,454,622 B2 | 11/2008 | Laidlaw et al. |
| 7,580,877 B1 | 8/2009 | Argenbright |
| 7,614,078 B1 | 11/2009 | Stieglitz |
| 7,680,819 B1 | 3/2010 | Mellmer et al. |
| 7,707,066 B2 | 4/2010 | Roever |
| 7,707,121 B1 | 4/2010 | Roever et al. |
| 7,774,499 B1 | 8/2010 | Popek et al. |
| 7,814,025 B2 | 10/2010 | Roever |
| 8,170,929 B1 | 5/2012 | Mallon et al. |
| 8,566,461 B1 | 10/2013 | Jun et al. |
| 8,571,992 B2 | 10/2013 | Roever et al. |
| 8,738,457 B2 | 5/2014 | Roever et al. |
| 9,177,338 B2 | 11/2015 | Collins et al. |
| 9,509,704 B2 | 11/2016 | Roever et al. |
| 9,621,372 B2 | 4/2017 | Roever et al. |
| 2001/0008557 A1 | 7/2001 | Stefik et al. |
| 2001/0026287 A1 | 10/2001 | Watanbe |
| 2001/0032312 A1 | 10/2001 | Runje et al. |
| 2002/0004847 A1 | 1/2002 | Tanno |
| 2002/0026445 A1 | 2/2002 | Chica et al. |
| 2002/0029183 A1 | 3/2002 | Vlahoplus et al. |
| 2002/0032646 A1 | 3/2002 | Sweeney et al. |
| 2002/0038278 A1 | 3/2002 | Himmelstein |
| 2002/0040346 A1 | 4/2002 | Kwan |
| 2002/0062249 A1 | 5/2002 | Iannacci |
| 2002/0082961 A1 | 6/2002 | Abrahm et al. |
| 2002/0091643 A1 | 7/2002 | Okamoto |
| 2002/0091646 A1 | 7/2002 | Lake et al. |
| 2002/0099564 A1 | 7/2002 | Kim |
| 2002/0106081 A1 | 8/2002 | Yang |
| 2002/0116471 A1 | 8/2002 | Shteyn |
| 2002/0128940 A1 | 9/2002 | Orrin et al. |
| 2002/0129140 A1 | 9/2002 | Peled et al. |
| 2002/0143703 A1 | 10/2002 | Razvan et al. |
| 2002/0147929 A1 | 10/2002 | Rose |
| 2002/0152126 A1 | 10/2002 | Lieu et al. |
| 2002/0152173 A1 | 10/2002 | Rudd |
| 2002/0152262 A1 | 10/2002 | Arkin et al. |
| 2002/0156743 A1 | 10/2002 | DeTreville |
| 2002/0178082 A1 | 11/2002 | Krause et al. |
| 2002/0184504 A1 | 12/2002 | Hughes |
| 2002/0198843 A1 | 12/2002 | Wang et al. |
| 2003/0004885 A1 | 1/2003 | Banerjee et al. |
| 2003/0023561 A1 | 1/2003 | Stefik et al. |
| 2003/0023564 A1 | 1/2003 | Padhye et al. |

(56) References Cited

U.S. PATENT DOCUMENTS

| | | |
|---|---|---|
| 2003/0028489 A1 | 2/2003 | Williamson |
| 2003/0046093 A1 | 3/2003 | Erickson et al. |
| 2003/0061566 A1 | 3/2003 | Rubstein et al. |
| 2003/0079122 A1 | 4/2003 | Asokan et al. |
| 2003/0084171 A1 | 5/2003 | de Jong |
| 2003/0084302 A1 | 5/2003 | de Jong |
| 2003/0093695 A1 | 5/2003 | Dutta |
| 2003/0125965 A1 | 7/2003 | Falso |
| 2003/0131048 A1 | 7/2003 | Najork |
| 2003/0140003 A1 | 7/2003 | Wang et al. |
| 2003/0140034 A1 | 7/2003 | Probst et al. |
| 2003/0159043 A1 | 8/2003 | Epstein |
| 2003/0182142 A1 | 9/2003 | Valenzuela et al. |
| 2003/0196087 A1 | 10/2003 | Stringer et al. |
| 2003/0200439 A1 | 10/2003 | Moskowitz |
| 2003/0208406 A1 | 11/2003 | Okamoto et al. |
| 2003/0217006 A1 | 11/2003 | Roever et al. |
| 2003/0220881 A1 | 11/2003 | Pirhonen et al. |
| 2003/0229593 A1 | 12/2003 | Raley |
| 2004/0034601 A1 | 2/2004 | Kreuzer |
| 2004/0039916 A1 | 2/2004 | Aldis et al. |
| 2004/0044627 A1 | 3/2004 | Russell |
| 2004/0044779 A1 | 3/2004 | Lambert |
| 2004/0054630 A1 | 3/2004 | Ginter et al. |
| 2004/0054915 A1 | 3/2004 | Jong et al. |
| 2004/0059678 A1 | 3/2004 | Stefik et al. |
| 2004/0083391 A1 | 4/2004 | de Jong |
| 2004/0113792 A1 | 6/2004 | Ireland et al. |
| 2004/0128546 A1 | 7/2004 | Blakeley |
| 2004/0133548 A1 | 7/2004 | Fielding et al. |
| 2004/0139207 A1 | 7/2004 | de Jong |
| 2004/0153552 A1 | 8/2004 | Trossen et al. |
| 2004/0177039 A1 | 9/2004 | Pincus |
| 2004/0196981 A1 | 10/2004 | Nakano et al. |
| 2004/0199577 A1 | 10/2004 | Burd et al. |
| 2004/0221045 A1 | 11/2004 | Joosten et al. |
| 2004/0243517 A1 | 12/2004 | Hansen |
| 2004/0243819 A1 | 12/2004 | Bourne et al. |
| 2004/0267671 A1 | 12/2004 | Nonaka et al. |
| 2004/0267673 A1 | 12/2004 | Ballard et al. |
| 2005/0004875 A1 | 1/2005 | Kontio et al. |
| 2005/0010486 A1 | 1/2005 | Pandhe |
| 2005/0027804 A1 | 2/2005 | Cahill et al. |
| 2005/0033700 A1 | 2/2005 | Vogler et al. |
| 2005/0038707 A1 | 2/2005 | Roever et al. |
| 2005/0038724 A1 | 2/2005 | Roever et al. |
| 2005/0091268 A1 | 4/2005 | Meyer et al. |
| 2005/0096938 A1 | 5/2005 | Slomkowski et al. |
| 2005/0138374 A1 | 6/2005 | Zheng et al. |
| 2005/0177716 A1 | 8/2005 | Ginter et al. |
| 2005/0204168 A1 | 9/2005 | Johnston et al. |
| 2005/0234860 A1 | 10/2005 | Roever et al. |
| 2005/0246193 A1 | 11/2005 | Roever et al. |
| 2005/0247777 A1 | 11/2005 | Pitroda |
| 2005/0251452 A1* | 11/2005 | Roever .................. G06Q 20/04 705/27.1 |
| 2005/0268115 A1* | 12/2005 | Barde ..................... G06F 21/10 713/189 |
| 2005/0273805 A1 | 12/2005 | Roever et al. |
| 2005/0276413 A1* | 12/2005 | Neogi ................. H04L 63/0428 380/28 |
| 2006/0036447 A1 | 2/2006 | Roever et al. |
| 2006/0036548 A1 | 2/2006 | Roever et al. |
| 2006/0059070 A1 | 3/2006 | Petruck |
| 2006/0064373 A1 | 3/2006 | Kelley |
| 2006/0080592 A1* | 4/2006 | Alves de Moura ....... G06F 8/38 717/120 |
| 2006/0136987 A1 | 6/2006 | Okuda |
| 2006/0167815 A1 | 7/2006 | Peinado et al. |
| 2006/0170759 A1 | 8/2006 | Roever et al. |
| 2006/0174350 A1 | 8/2006 | Roever et al. |
| 2006/0179003 A1 | 11/2006 | Steele et al. |
| 2006/0259422 A1 | 11/2006 | Sutton et al. |
| 2007/0016533 A1 | 1/2007 | Fujimura |
| 2007/0087840 A1 | 4/2007 | Fayter et al. |
| 2007/0136694 A1* | 6/2007 | Friedman .............. G06F 3/0238 715/840 |
| 2007/0157320 A1 | 7/2007 | Collins et al. |
| 2007/0162300 A1 | 7/2007 | Roever et al. |
| 2007/0208720 A1 | 9/2007 | Probst et al. |
| 2007/0233602 A1 | 10/2007 | Zweig et al. |
| 2007/0250453 A1 | 10/2007 | Sako et al. |
| 2007/0255965 A1 | 11/2007 | McGucken |
| 2007/0286076 A1 | 12/2007 | Roever et al. |
| 2007/0286393 A1 | 12/2007 | Roever et al. |
| 2008/0067230 A1 | 3/2008 | Silverbrook et al. |
| 2008/0148056 A1 | 6/2008 | Ginter et al. |
| 2008/0205850 A1 | 8/2008 | Collins et al. |
| 2008/0235043 A1 | 9/2008 | Goulandris et al. |
| 2008/0243693 A1 | 10/2008 | Thrasher et al. |
| 2009/0070218 A1 | 3/2009 | Farmanfarmaian |
| 2009/0119500 A1 | 5/2009 | Roth et al. |
| 2009/0193249 A1 | 7/2009 | Conrado et al. |
| 2009/0193526 A1 | 7/2009 | Sweazey |
| 2009/0275402 A1 | 11/2009 | Backover et al. |
| 2009/0288012 A1 | 11/2009 | Hertel et al. |
| 2010/0161444 A1 | 6/2010 | Roever et al. |
| 2010/0162408 A1 | 6/2010 | Roever et al. |
| 2010/0257111 A1 | 10/2010 | Veugen et al. |
| 2010/0299718 A1 | 11/2010 | Roever et al. |
| 2011/0178861 A1 | 7/2011 | Georgi |
| 2011/0197285 A1 | 8/2011 | Ginter et al. |
| 2011/0296515 A1 | 12/2011 | Krstic et al. |
| 2012/0090018 A1 | 4/2012 | Padhye et al. |
| 2012/0198513 A1 | 8/2012 | Maida-Smith et al. |
| 2013/0036476 A1 | 2/2013 | Roever et al. |
| 2014/0019372 A1 | 1/2014 | Roever et al. |
| 2014/0236746 A1 | 8/2014 | Roever et al. |
| 2015/0026080 A1 | 1/2015 | Roever et al. |
| 2017/0083720 A1 | 3/2017 | Roever et al. |
| 2018/0019891 A1 | 1/2018 | Roever et al. |

FOREIGN PATENT DOCUMENTS

| | | |
|---|---|---|
| JP | 2002-140631 | 5/2002 |
| WO | WO 98/43211 | 10/1998 |
| WO | WO 01/11452 | 2/2001 |
| WO | WO 01/84906 | 11/2001 |
| WO | WO 2002/011033 | 2/2002 |
| WO | WO 03/098398 | 11/2003 |
| WO | WO 2004/038567 | 5/2004 |
| WO | WO 2005/116841 | 12/2005 |
| WO | WO 2007/033005 | 3/2007 |
| WO | WO 2007/033055 | 3/2007 |
| WO | WO 2007/078987 | 7/2007 |
| WO | WO 2007/130416 | 11/2007 |
| WO | WO 2007/130502 | 11/2007 |
| WO | WO 2013/019519 | 2/2013 |

OTHER PUBLICATIONS

U.S. Office Action dated Feb. 9, 2017 issued in U.S. Appl. No. 14/031,908.

U.S. Notice of Allowance dated Jan. 20, 2017 issued in U.S. Appl. No. 11/741,952.

U.S. Office Action dated Dec. 29, 2016 issued in U.S. Appl. No. 11/940,747.

FlexTicket. [Online] Available: http://info.isl.ntt.co.jp/flexticket/index.html, Last Modified Dec. 25, 2001.

Weitzel, "Liberty ID-WSF Implementation Guide," Liberty Alliance Project, Jan. 1, 2005.

U.S. Office Action dated Jul. 1, 2016 issued in U.S. Appl. No. 11/155,010.

U.S. Office Action dated Apr. 6, 2016 issued in U.S. Appl. No. 14/245,885.

U.S. Final Office Action dated Jan. 11, 2016 issued in U.S. Appl. No. 11/679,760.

U.S. Office Action dated Mar. 9, 2016 issued in U.S. Appl. No. 14/031,908.

U.S. Appl. No. 11/830,717, filed Jul. 30, 2007, Roever et al.

U.S. Final Office Action dated Aug. 29, 2016 issued in U.S. Appl. No. 14/031,908.

(56) References Cited

OTHER PUBLICATIONS

U.S. Office Action dated Oct. 12, 2016 issued in U.S. Appl. No. 12/850,454.
U.S. Final Office Action dated Dec. 21, 2015 issued in U.S. Appl. No. 11/741,952.
U.S. Office Action dated Aug. 31, 2015 issued in U.S. Appl. No. 11/742,253.
U.S. Final Office Action dated Feb. 23, 2016 issued in U.S. Appl. No. 11/742,253.
U.S. Final Office Action dated Feb. 1, 2016 issued in U.S. Appl. No. 11/940,747.
U.S. Office Action dated Dec. 4, 2015 issued in U.S. Appl. No. 11/940,753.
U.S. Final Office Action dated Apr. 13, 2016 issued in U.S. Appl. No. 11/940,753.
U.S. Final Office Action dated Mar. 9, 2016 issued in U.S. Appl. No. 13/558,238.
U.S. Notice of Allowance dated Sep. 19, 2016 issued in U.S. Appl. No. 13/558,238.
U.S. Final Office Action dated Feb. 22, 2017 issued in U.S. Appl. No. 11/155,010.
U.S. Office Action dated Jan. 10, 2018 issued in U.S. Appl. No. 14/245,885.
U.S. Final Office Action dated Jun. 19, 2017 issued in U.S. Appl. No. 12/850,454.
U.S. Office Action dated Oct. 27, 2017 issued in U.S. Appl. No. 15/448,473.
U.S. Final Office Action dated Jun. 5, 2018 issued in U.S. Appl. No. 15/448,473.
U.S. Office Action dated Jan. 26, 2018 issued in U.S. Appl. No. 11/742,253.
U.S. Final Office Action dated Oct. 6, 2017 issued in U.S. Appl. No. 11/940,747.
U.S. Office Action dated Apr. 18, 2017 issued in U.S. Appl. No. 11/940,753.
U.S. Office Action dated May 19, 2017 issued in U.S. Appl. No. 15/298,103.
Miller, Mark S. and Shapiro, Jonathan S. (2003) "Paradigm Regained: Abstraction Mechanisms for Access Control," *HP Laboratories*, Palo Alto, HPL-2003-222, 22 pages; to be published in and presented at ASIAN'03, Dec. 10-13, 2003, Mumbai, India [Downloaded on Jul. 12, 2017 from http://www.hpl.hp.com/techreports/2003/HPL-2003-222].
U.S. Office Action dated Oct. 3, 2008 issued in U.S. Appl. No. 11/094,784.
U.S. Office Action dated Sep. 15, 2009 issued in U.S. Appl. No. 10/873,841.
U.S. Office Action dated Mar. 27, 2009 issued in U.S. Appl. No. 11/096,284.
U.S. Office Action dated Feb. 25, 2008 issued in U.S. Appl. No. 10/873,840.
U.S. Final Office Action dated Dec. 3, 2008 issued in U.S. Appl. No. 10/873,840.
U.S. Office Action dated May 28, 2009 issued in U.S. Appl. No. 10/873,840.
U.S. Office Action dated Feb. 9, 2005 issued in U.S. Appl. No. 10/232,861.
U.S. Office Action dated Jul. 27, 2005 issued in U.S. Appl. No. 10/232,861.
U.S. Office Action dated Dec. 2, 2005 issued in U.S. Appl. No. 10/232,861.
U.S. Final Office Action dated Jun. 21, 2006 issued in U.S. Appl. No. 10/232,861.
U.S. Office Action dated Nov. 30, 2006 issued in U.S. Appl. No. 10/232,861.
U.S. Final Office Action dated Jun. 14, 2007 issued in U.S. Appl. No. 10/232,861.
U.S. Office Action dated May 15, 2008 issued in U.S. Appl. No. 10/232,861.
U.S. Final Office Action dated Dec. 5, 2008 issued in U.S. Appl. No. 10/232,861.
U.S. Office Action dated Jun. 24, 2009 issued in U.S. Appl. No. 10/232,861.
U.S. Final Office Action dated Dec. 14, 2009 issued in U.S. Appl. No. 10/232,861.
U.S. Office Action dated Aug. 24, 2009 issued in U.S. Appl. No. 11/155,010.
U.S. Office Action dated May 26, 2010 issued in U.S. Appl. No. 11/155,010.
U.S. Miscellaneous Communication dated Jun. 11, 2010 issued in U.S. Appl. No. 11/155,010.
U.S. Office Action dated Apr. 5, 2013 issued in U.S. Appl. No. 11/155,010.
U.S. Office Action dated Dec. 18, 2013 issued in U.S. Appl. No. 11/155,010.
U.S. Final Office Action dated Jul. 23, 2014 issued in U.S. Appl. No. 11/155,010.
U.S. Office Action dated May 22, 2006 issued in U.S. Appl. No. 10/414,817.
U.S. Office Action dated Nov. 28, 2006 issued in U.S. Appl. No. 10/414,817.
U.S. Final Office Action dated Apr. 30, 2007 issued in U.S. Appl. No. 10/414,817.
U.S. Office Action dated Oct. 3, 2007 issued in U.S. Appl. No. 10/414,817.
U.S. Final Office Action dated Jun. 11, 2008 issued in U.S. Appl. No. 10/414,817.
U.S. Office Action dated Dec. 24, 2008 issued in U.S. Appl. No. 10/414,817.
U.S. Final Office Action dated Jun. 12, 2009 issued in U.S. Appl. No. 10/414,817.
U.S. Notice of Allowance dated Jan. 27, 2010 issued in U.S. Appl. No. 10/414,817.
U.S. Office Action dated Oct. 1, 2010 issued in U.S. Appl. No. 12/716,089.
U.S. Final Office Action dated May 18, 2011 issued in U.S. Appl. No. 12/716,089.
U.S. Office Action dated Jul. 1, 2013 issued in U.S. Appl. No. 12/716,089.
U.S. Notice of Allowance dated Feb. 5, 2014 issued in U.S. Appl. No. 12/716,089.
U.S. Office Action dated Dec. 22, 2005 issued in U.S. Appl. No. 10/414,830.
U.S. Office Action dated Feb. 7, 2007 issued in U.S. Appl. No. 10/414,380.
U.S. Office Action dated Oct. 4, 2010 issued in U.S. Appl. No. 11/679,760.
U.S. Final Office Action dated May 27, 2011 issued in U.S. Appl. No. 11/679,760.
U.S. Office Action dated Jan. 5, 2012 issued in U.S. Appl. No. 11/679,760.
U.S. Final Office Action dated Sep. 27, 2012 issued in U.S. Appl. No. 11/679,760.
U.S. Office Action dated May 20, 2013 issued in U.S. Appl. No. 11/679,760.
U.S. Final Office Action dated Feb. 26, 2014 issued in U.S. Appl. No. 11/679,760.
U.S. Office Action dated Jan. 5, 2015 issued in U.S. Appl. No. 11/679,760.
U.S. Office Action dated Jun. 9, 2015 issued in U.S. Appl. No. 11/679,760.
U.S. Office Action dated Dec. 20, 2005 issued in U.S. Appl. No. 10/440,286.
U.S. Final Office Action dated Jul. 13, 2006 issued in U.S. Appl. No. 10/440,286.
U.S. Office Action dated Jan. 30, 2007 issued in U.S. Appl. No. 10/440,286.
U.S. Final Office Action dated Jun. 28, 2007 issued in U.S. Appl. No. 10/440,286.
U.S. Office Action dated Dec. 27, 2007 issued in U.S. Appl. No. 10/440,286.

(56) References Cited

OTHER PUBLICATIONS

U.S. Final Office Action dated Aug. 6, 2008 issued in U.S. Appl. No. 10/440,286.
U.S. Office Action dated Nov. 18, 2008 issued in U.S. Appl. No. 10/440,286.
U.S. Final Office Action dated Feb. 11, 2009 issued in U.S. Appl. No. 10/440,286.
U.S. Advisory Action Before the Filing of an Appeal Brief dated May 28, 2009 issued in U.S. Appl. No. 10/440,286.
U.S. Notice of Allowance dated Dec. 24, 2009 issued in U.S. Appl. No. 10/440,286.
U.S. Office Action dated Jul. 13, 2011 issued in U.S. Appl. No. 12/717,007.
U.S. Office Action dated Oct. 4, 2011 issued in U.S. Appl. No. 12/717,007.
U.S. Final Office Action dated May 2, 2012 issued in U.S. Appl. No. 12/717,007.
U.S. Notice of Allowance dated Jul. 8, 2013 issued in U.S. Appl. No. 12/717,007.
U.S. Office Action dated Jan. 14, 2008 issued in U.S. Appl. No. 10/439,629.
U.S. Final Office Action dated Oct. 23, 2008 issued in U.S. Appl. No. 10/439,629.
U.S. Office Action dated Jan. 28, 2009 issued in U.S. Appl. No. 10/439,629.
U.S. Notice of Allowance dated May 10, 2010 issued in U.S. Appl. No. 10/439,629.
U.S. Office Action dated Sep. 30, 2011 issued in U.S. Appl. No. 12/850,454.
U.S. Final Office Action dated Aug. 31, 2012 issued in U.S. Appl. No. 12/850,454.
U.S. Office Action dated Sep. 23, 2014 issued in U.S. Appl. No. 12/850,454.
U.S. Final Office Action dated Mar. 6, 2015 issued in U.S. Appl. No. 12/850,454.
U.S. Office Action dated Sep. 26, 2007 issued in U.S. Appl. No. 11/118,608.
U.S. Office Action dated May 14, 2008 issued in U.S. Appl. No. 11/118,608.
U.S. Office Action dated Nov. 10, 2008 issued in U.S. Appl. No. 11/118,608.
U.S. Final Office Action dated Apr. 16, 2009 issued in U.S. Appl. No. 11/118,608.
U.S. Office Action dated Mar. 16, 2009 issued in U.S. Appl. No. 11/146,399.
U.S. Office Action dated Mar. 22, 2011 issued in U.S. Appl. No. 11/741,952.
U.S. Final Office Action dated Sep. 27, 2011 issued in U.S. Appl. No. 11/741,952.
U.S. Office Action dated Oct. 18, 2013 issued in U.S. Appl. No. 11/741,952.
U.S. Final Office Action dated May 20, 2014 issued in U.S. Appl. No. 11/741,952.
U.S. Office Action dated Sep. 5, 2014 issued in U.S. Appl. No. 11/741,952.
U.S. Final Office Action dated Feb. 18, 2015 issued in U.S. Appl. No. 11/741,952.
U.S. Office Action dated Aug. 11, 2015 issued in U.S. Appl. No. 11/741,952.
U.S. Office Action dated Aug. 11, 2011 issued in U.S. Appl. No. 11/742,253.
U.S. Final Office Action dated May 21, 2012 issued in U.S. Appl. No. 11/742,253.
U.S. Office Action dated Sep. 21, 2010 issued in U.S. Appl. No. 11/645,139.
U.S. Final U.S. Office Action dated May 5, 2011 issued in U.S. Appl. No. 11/645,139.
U.S. Office Action dated Nov. 7, 2014 issued in U.S. Appl. No. 11/645,139.
U.S. Notice of Allowance dated Jul. 10, 2015 issued in U.S. Appl. No. 11/645,139.
U.S. Office Action dated Nov. 29, 2010 issued in U.S. Appl. No. 11/940,747.
U.S. Final Office Action dated Aug. 23, 2011 issued in U.S. Appl. No. 11/940,747.
U.S. Office Action dated Mar. 26, 2015 issued in U.S. Appl. No. 11/940,747.
U.S. Office Action dated Jul. 12, 2010 issued in U.S. Appl. No. 11/940,753.
U.S. Final Office Action dated Jan. 24, 2011 issued in U.S. Appl. No. 11/940,753.
U.S. Office Action dated Nov. 7, 2014 issued in U.S. Appl. No. 11/940,753.
U.S. Final Office Action dated May 22, 2015 issued in U.S. Appl. No. 11/940,753.
U.S. Office Action dated May 22, 2013 issued in U.S. Appl. No. 13/558,238.
U.S. Final Office Action dated Feb. 28, 2014 issued in U.S. Appl. No. 13/558,238.
U.S. Office Action dated Nov. 5, 2014 issued in U.S. Appl. No. 13/558,238.
U.S. Final Office Action dated Feb. 24, 2015 issued in U.S. Appl. No. 13/558,238.
U.S. Office Action dated Jul. 2, 2015 issued in U.S. Appl. No. 13/558,238.
PCT International Search Report and Written Opinion dated Feb. 16, 2006 issued in PCT Application No. PCT/US2005/021057.
PCT Notification Concerning Transmittal of International Preliminary Report on Patentability dated Jan. 11, 2007 issued in PCT Application No. PCT/US2005/021057.
PCT International Search Report and Written Opinion dated Nov. 25, 2003 issued in PCT Application No. PCT/US03/15614.
Chinese First Office Action dated Dec. 26, 2008 issued in CN Application No. 03816746.8.
European Communication dated Oct. 19, 2006 issued in EP Application No. 03 72 6905.7.
European Office Action dated Oct. 27, 2008 issued in EP Application No. 03 72 6905.7.
European Office Action dated Nov. 6, 2008 issued in EP Application No. 03 72 6905.7.
European Office Action dated Apr. 9, 2010 issued in EP Application No. 03 72 6905.7.
JP Office Action dated Mar. 24, 2009 issued in JP Application No. 2004-505848.
PCT International Search Report and Written Opinion dated Sep. 16, 2008 issued in PCT/US07/10560.
PCT International Preliminary Report on Patentability and Written Opinion dated Nov. 4, 2008 issued in PCT/US07/10560.
PCT International Search Report and Written Opinion dated Dec. 7, 2007 issued in PCT/US07/010708.
PCT International Preliminary Report on Patentability and Written Opinion dated Nov. 13, 2008 issued in PCT/US2007/010708.
PCT International Search Report and Written Opinion dated Feb. 20, 2008 issued in PCT/US06/48776.
PCT International Preliminary Report on Patentability and Written Opinion dated Jul. 10, 2008 issued in PCT/US2006/048776.
European Extended Search Report dated Nov. 28, 2013 issued in EP 06 847 910.4.
PCT International Search Report and Written Opinion dated Jan. 17, 2013 issued in PCT/US2012/048182.
PCT International Preliminary Report on Patentability and Written Opinion dated Feb. 13, 2014 issued in PCT/US2012/048182.
"The OAuth 2.0 Authorization Protocol", (Abstract) draft-ietf-oauth-v2-28, Network Working Group, E. Hammer, Ed., Jun. 19, 2012, 48 pages.
Ahn et al. Managing privacy preferences for federated identity management, in Proc. DIM '05: Proceedings of the 2005 workshop on Digital identity management, Fairfax, VA, USA, 2005, pp. 28-36.
Alladin/Preview Systems, HASP SL, Alladin/Preview Systems, 2004.

(56) References Cited

OTHER PUBLICATIONS

Bohrer, K. and Holland, B. "Customer Profile Exchange (CPExchange) Specification", *International Digital Enterprise Alliance, Inc.*, Version 1.0, Oct. 20, 2000.
Burdett, D. RFC 2801: Internet Open Trading Protocol, [Online]. Apr. 2000. Available: http://www.faqs.org/rfcsl rfc2801.html.
Business.com, Preview Systems, Inc. Profile, [Online]. 2006. Available: http://www.business.com/directory/telecommunicationslpreview_systems_inc/profile/.
Cobèna, (2003) "Thèse d'Informatique, spècialitè Algorithmique, Change Management of Semi-Structure Data on the Web", soutenue le Jun. 26, 2003 par, *Ecole Doctorale de l'Ecole Polytechnique*, 228 pages.
Cox B., Tygar J., Sirbu M., "Netbill Security and Transaction Protocol." First USENIX Workshop on Electronic Commerce, Jul. 1995.
Fielding, (Jan. 2000) "Architectural Styles and the Design of Network-based Software Architectures", University of California, Irvine, Dissertation, 90 pages.
Fujimura, K. and Eastlake, D., RFC 3506: Requirements and Design for Voucher Trading System [VTS], United States: Network Working Group, Mar. 2003, [online] Available at http://rfc.net/rfc3506.html.
Fujimura et al. XML Ticket: Generalized Digital Ticket Definition Language, 1999.
Fujimura et al. "General Purpose Digital Ticket Framework", Boston, MA: 3rd USENIX Workshop on Electronic Commerce, 1998.
Fujimura et al. "A Worldwide Supermarket Scheme Using Rights Trading System", in Proc. ICPADS '00: Proceedings of the Seventh International Conference on Parallel and Distributed Systems: Workshops, Washington, DC, USA 2000, p. 289.
Fujimura et al., "Digital Ticket Controlled Digital Ticket Circulation", USENIX, 1999.
Haller et al., (May 1996) "A One-Time Password System", *Kaman Sciences Corporation, Network Working Group*, Request for Comments 1938, Category: Standards Track, 18 pp.
Hardjono, T. and Seberry, J., "Strongboxes for Electronic Commerce", Oakland, CA: 2nd USENIX Workshop on Electronic Commerce, 1996.
Hettinga, "UNDRs and Bearer other stuff" besides cash [was Re: ESIGN Act], http://legalminds.Jp.findlaw.com/list/cyberia-1/msg:31650.html, May 29, 2001.
Iguchi et al. Voucher Integrated C2B and C2C Trading Model. May 2002 [Online]. Available: http://wwwconf.ecs.soton.ac.uk/archive/00000272/01/index.html.
IETF Internet Open Trading Protocol Working Group Publishes RFC for Voucher Trading System, Cover Pages. [Online]. May 2003. Available: http://xml.coverpages.org/ni2003-05-15-a.html.
Internet Open Trading Protocol, Cover Pages. [Online] Dec. 2002, Available: http://xml.coverpages.org/otp.html.
Josang et al. "Trust Requirements in Identity Management." Australian Information Security Workshop, 2005.
Kumar et al. Sales Promotions on the Internet, Boston, MA: 3rd USENIX Workshop on Electronic Commerce, 1998.
Kuno et al., "A Digital Ticket Circulation Architecture, 58th Conference Collected Papers (4)", *Information Processing Society of Japan*, Japan, Mar. 11, 1999, pp. 4-295-4-296.

Lamport, "Password Authentication with Insecure Communication", Communications of the ACM, Nov. 1981, vol. 24, No. 11, pp. 770-772.
Manasse ("Why Rights Management is Wrong (and What to Do Instead)", SRC Technical Note, Compaq System Research Center, Jan. 21, 2001, 7 pages).
Matsuyama et al., "Distributed digital-ticket management for rights trading system", in Proc. EC '99: Proceedings of the 1st ACM conference on Electronic commerce, Denver, Colorado, United States, 1999, pp. 110-118.
Medvinsky, G. and Neuman, B.C., "NetCash: A design for practical electronic currency on the Internet", *Proceedings of the First ACM Conference on Computer and Communications Security*, Nov. 1993.
Menezes et al., Handbook of Applied Cryptography, 1997 CRC Press LLC, Section 1.7.
Mont et al., "Towards Accountable Management of Identity and Privacy: Sticky Policies and Enforceable Tracing Services", Hewlett Packard, 2003.
OECD (Jan. 27, 2006) OECD Guidelines on the Protection of Privacy and Transborder Flows of Personal Data [br], [online]. Available: http://www.oecd.org/document/18/0.2340, en_2649_201185_1815186_1_1_1_1.00.
Rahn, http://www.nettime.org/Lists-Archives/nettime-1-0009/msg00214.html, Sep. 22, 2000.
Skinner et al., "A Framework of privacy shield in organizational information systems," *Proceedings of Int'l Conference on Mobile Business*, 2005.
Software Requirements Specification for <Project> template, Version 1.1 approved, Copyright © 2002 by Karl E. Wiegers, section 2.4, Operating Environments, downloaded from www.processimpact.com, 8 pp.
Stewart, "The Future of Digital Cash on the Internet". [online] Available: http://www.arraydev.com/commerce/JIBC/9703-02.htm, printed Jan. 26, 2006.
Szabo, "Contracts with Bearer" http://szabo.best.vwh.net/bearer_contracts.html, 12 pages [1997].
Terada et al. "Copy Prevention Scheme for Rights Trading Infrastucture", 2000.
Terada et al., RFC 4153: "XML Voucher: Generic Voucher Language", Network Working Group, Sep. 2005.
Terada et al., RFC 4154: Voucher Trading System Application Programming Interface, Sep. 2005 [online] Available: http://www.rfc-archive.org/getrfc.php?rfc=4154.
The UNIX Operating System: Mature, Standardized and State-of-the-Art, White Paper issued in Aug. 1997 downloaded on Sep. 21, 2011 from http://www.unix.org/whitepapers/wp-0897.html, 4 pp.
Tilkov, Stefan, "A Brief Introduction to REST", posted on Dec. 10, 2007 at http://www.infoq.com/articles/rest-introduction, 10 pages.
"US Navy: Military Exchanges now offer best price guarantee," M2 Presswire, Conventry, Jun. 4, 1998, p. 1 [recovered from Proquest May 17, 2006].
Wikipedia—Hash Chain: http://en.wikipedia.org/wiki/Hash_chain, downloaded Feb. 27, 2011.
XML Voucher: Generic Voucher Language, Cover Pages [Online] May 2003, Available: http://xml.coverpages.org/xmlVoucher.html.

\* cited by examiner

SOFTWARE, SYSTEMS, AND METHODS FOR PROCESSING DIGITAL BEARER INSTRUMENTS

CROSS REFERENCE TO RELATED APPLICATIONS

The present application is a continuation of and claims priority under 35 U.S.C. 120 to U.S. patent application Ser. No. 11/645,139 for Software, Systems, and Methods for Processing Digital Bearer Instruments filed on Dec. 22, 2006, which claims priority under 35 U.S.C. 119(e) to U.S. Provisional Application No. 60/755,750 filed on Dec. 29, 2005, and U.S. Provisional Application No. 60/765,388 filed on Feb. 2, 2006. The entire disclosure of each of the foregoing applications is incorporated herein by reference for all purposes. The present application also relates to subject matter described in the following applications, each of which is incorporated herein by reference in its entirety for all purposes: U.S. patent application Ser. No. 10/232,861, U.S. patent application Ser. No. 10/414,817, U.S. patent application Ser. No. 10/414,830, U.S. patent application Ser. No. 10/439,629, U.S. patent application Ser. No. 10/440,286, U.S. patent application Ser. No. 11/096,284, U.S. patent application Ser. No. 11/155,010, U.S. Provisional Patent Application No. 60/865,983, U.S. Provisional Patent Application No. 60/746,032, and International Patent Application No. PCT/US2003/015614 corresponding to International Publication No. WO 03/098398 A2.

COPYRIGHT NOTICE

A portion of the disclosure of this patent document contains material that is subject to copyright protection. The copyright owner has no objection to anyone reproducing the patent disclosure as it appears in the Patent and Trademark Office patent files or records. However, the copyright owner strictly reserves all other copyrights.

BACKGROUND

The present invention relates to systems, methods, and software for providing and processing digital bearer instruments, and, more particularly, digital titles containing at least one digital bearer right, and to associated methods of electronic commerce using such systems, methods, and software. Still more particularly, the present invention provides systems, methods, and software for providing and processing such digital bearer instruments and related electronic commerce securely. The present invention therefore has relevance to the fields of computer science, computer security, and electronic commerce.

SUMMARY

According to one class of embodiments of the present invention, methods and apparatus are provided according to which one or more computing platforms are configured to instantiate one or more operating environments for processing title objects. Each title object is a digital bearer instrument representing at least one right which may be redeemed by presentation of the title object to a title-enabled process. Each title object identifies at least one of the one or more operating environments. The one or more computing platforms are configured to instantiate each operating environment by selectively instantiating a plurality of operating environment components according to a corresponding predefined operating context which specifies the operating environment. The plurality of operating environment components are operable to facilitate redemption of the rights represented by the title objects identifying the corresponding operating environment.

According to another class of embodiments, methods and apparatus are provided according to which one or more computing platforms are configured to instantiate one or more verified operating environments for processing title objects. Each title object is a digital bearer instrument representing at least one right which may be redeemed by presentation of the title object to a title-enabled process. Each title object identifies at least one of the one or more verified operating environments. The one or more computing platforms are configured to instantiate each verified operating environment by instantiating a plurality of integrity-verified components. The integrity-verified components are configured to facilitate redemption of the rights represented by the title objects identifying the corresponding verified operating environment. The instantiated integrity-verified components cannot be undetectably altered.

According to a further class of embodiments, methods and apparatus are provided according to which one or more computing platforms are configured to instantiate one or more verified operating environments for processing title objects. Each title object is a digital bearer instrument representing at least one right which may be redeemed by presentation of the title object to a title-enabled process. Each title object identifies at least one of the one or more verified operating environments. The one or more computing platforms are configured to instantiate each verified operating environment by selectively instantiating a plurality of integrity-verified components according to a corresponding predefined operating context which specifies the verified operating environment. The plurality of integrity-verified components are configured to facilitate redemption of the rights represented by the title objects identifying the corresponding verified operating environment. The selectively instantiated integrity-verified components cannot be undetectably altered.

According to still another class of embodiments, methods and apparatus are provided for processing digital bearer instruments. At least one title expressing at least one right is provided. At least one operating context corresponding to said right is provided. The context is configured to provide an operating environment effective to process the at least one right. The operating context is selected from the group consisting of embedded, named, and referenced operating contexts. The operating environment is selected from the group consisting of assured, cryptographically assured, defined, assured and defined, and cryptographically assured and defined.

There are more specific embodiments within the various classes of embodiments which relate to a variety of features. For example, according to some specific embodiments, each of the title objects identifies the operating context corresponding to the operating environment identified by the title object. The one or more computing platforms are configured to instantiate the one or more operating environments with reference to the operating contexts identified by the title objects. According to some of these embodiments, a first one of the title objects includes an operating context identifier which points to the corresponding operating context stored externally to the first title object. According to others, a first one of the title objects includes at least a portion of the operating context identified by the first title object. Alternatively, the one or more computing platforms are configured to instantiate a single operating environment with reference to the corresponding operating context.

According to embodiments in which the operating environment components comprise a plurality of integrity-verified components which cannot be undetectably altered, the one or more computing platforms may be configured to instantiate the plurality of integrity-verified components using digital signatures and manifests.

The various classes of embodiments may be implemented on a variety of platforms. Such platforms may include, for example one or more of a handheld device, a personal computer, a server, a network appliance, a piece of networking equipment, a single computing platform, or a distributed computing platform.

According to specific embodiments, a first one of the title objects may identify a plurality of operating environments each of which corresponds to a different operating context. Each of the operating environments identified by the first title object correspond to a different right represented by the first title object. The one or more computing platforms are configured to instantiate each of the operating environments with reference to one of the operating contexts.

According to some embodiments, the one or more computing platforms are deployed in a network including a plurality of additional computing platforms. First ones of the additional computing platforms corresponding to additional operating environments configured to process the title objects, wherein the one or more computing platforms are configured to interoperate with the first additional computing platforms to facilitate redemption of the rights represented by the title objects. According to embodiments in which the one or more operating environments are verified, second ones of the additional computing platforms correspond to unverified operating environments intervening between the one or more computing platforms and at least some of the first additional computing platforms.

According to a specific embodiment, a first one of the operating environment components is configured to instantiate a user interface configured to facilitate interaction by a user with selected ones of the title objects associated with the user. The user interface includes a first presentation mode in which a tab corresponding to the user interface is presented at an edge of a display window, and a second presentation mode in which a user interface window connected to the tab is overlaid on the display window. The user interface window includes user interface objects configured to facilitate interaction by the user with the selected title objects. Selection of the tab results in the user interface window appearing to slide in to or out from the edge of the display window.

A further understanding of the nature and advantages of the present invention may be realized by reference to the remaining portions of the specification and the drawings.

DESCRIPTION OF SPECIFIC EMBODIMENTS

Figure 1:
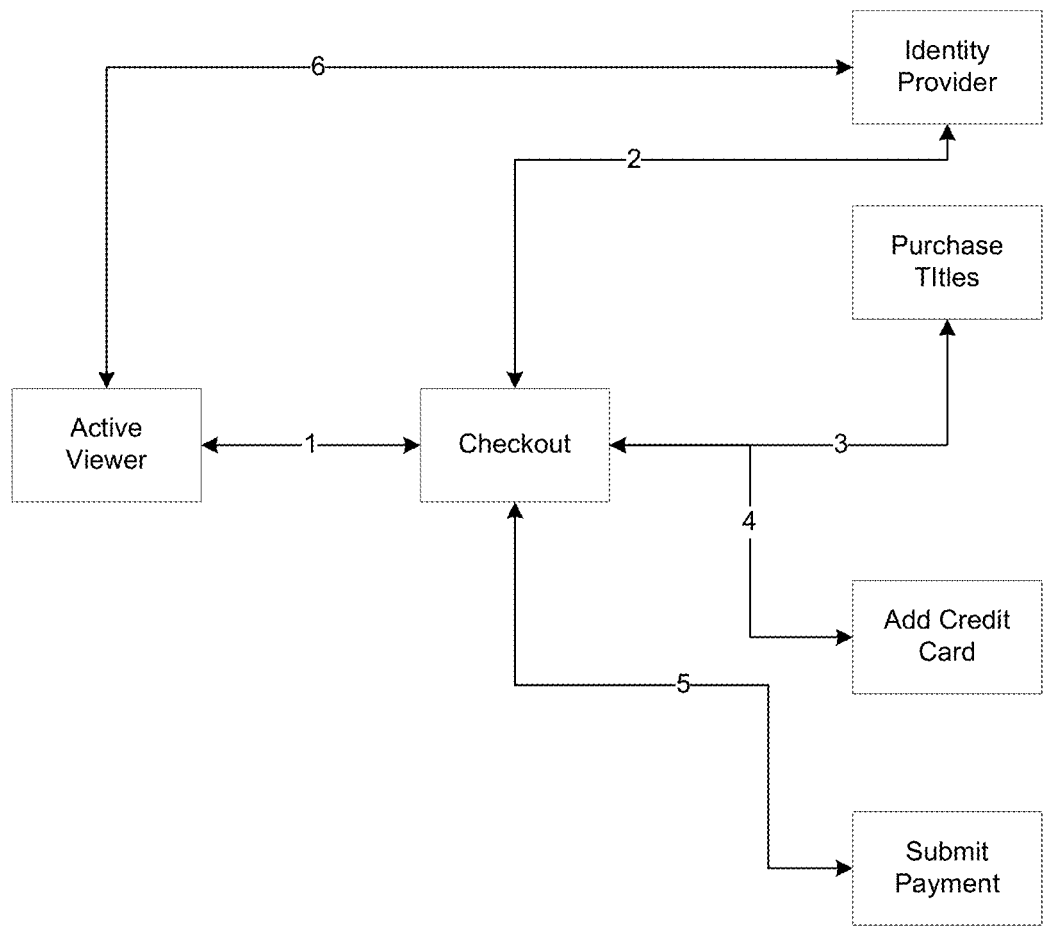
FIG. 1 is a simplified diagram of the architecture of a system for processing title objects according to a specific embodiment of the invention.

Reference will now be made in detail to specific embodiments of the invention, including the best modes contemplated by the inventors for carrying out the invention, and examples of these specific embodiments are illustrated in the text and accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Embodiments of the present invention relate to rights-based technologies such as those described in International Publication No. WO 03/098398 A2; U.S. Provisional Patent Application No. 60/865,983, and U.S. Provisional Patent Application No. 60/746,032 incorporated herein by reference above. Basic principles of rights-based objects and processes which may be implemented with various embodiments of the invention are described in these publication.

Benefits of definition and assurance, benefits to user/rights-holder, the rights-providers.

Pull thru all of the existing platforms.

Defined, assured, and defined+assured regarding UI.

Rights Processing Architecture

According to various embodiments, the present invention provides an architecture that enables provision of an extensible applications framework that flexibly supports a variety of features and functionality supporting title-based rights processing operations. Specifically, the present invention provides additional methods of defining and assuring rights processing operating environments to extend the capabilities of rights processing operating environments in a variety of novel ways. Environments for processing titles and the rights expressed therein have been established using systems and methods as described in the above-referenced International and U.S. patent applications. These environments are statically defined rights operating environments that operate in controlled server environments; the environments are established by configuring an arrangement of rights processing systems, and then providing titles that are processed by these systems.

According to some embodiments, additional capabilities have been created for rights operating environments. These capabilities permit rights processing environments to be used outside of controlled server-based environments, including operating rights processing environments in which one or more portions are formally defined or in which configurations are formally assured against tampering, spoofing, and other Internet ills. Formally defining title processing environments permits a title processing environment to determine if it is able to properly process a redeemed right expressed by at least one title prior to starting the processing of that right. It also eases the burden of provisioning title processing environments by system administrators responsible for keeping these environments operating. The formal definition of an operating environment is sometimes called an operating context. Assurance of title processing environments are technical means by which the components and configurations which comprise a title processing environment may be determined to be free from tampering or changes from a known, defined standard. In many cases, assurance is provided using cryptographic means, such as digital signatures and hashes. Application of these cryptographic means for assurance of processing environments is well understood to those skilled in the art. Some title processing environments may be both defined and assured, meaning that they are formally defined and their components are assured to be free from tampering or unauthorized changes. Defined, assured, and defined+assured title processing environments significantly extend the capabilities of title processing environments by:

supporting the seamless deployment of distributed title processing capabilities to untrusted host computing platforms, by permitting efficient identification of whether a specific title or right being presented for redemption is being processed by an authentic title processing environment, by permitting efficient determination by the title processing environment as to whether the specific instance of a title processing environment is able to process the presented title in accordance with the specifications of the right, and by providing instructions to the instance of a title processing environments as to the components required in order to process the title.

Furthermore, in accordance with specific embodiments of the present invention, the user interaction with a title processing environment may be specified and defined in order to assure content providers and merchant sellers of the user interaction provided during title processing.

In one embodiment, the present invention provides systems, methods, and software for processing digital bearer instruments in accordance with configurations specified in at least one operating context. The operating context(s) required may be provided within an existing operating environment, as part of a title for which a right is being redeemed, or as part of an external service to one or more operating environments. In one embodiment, the present invention provides a system that comprises at least one title expressing at least one right. The creation and use of such titles and rights in accordance with the invention can be provided by those having ordinary skill in the art using specific examples can be found in the above-referenced International and U.S. patent applications. In the embodiment described here, the system further comprises at least one operating context corresponding to the right(s) expressed by the title. The operating context is configured to describe and/or provide components of an operating environment that is effective to process the right(s). There may be a no operating context provided the title, or a single operating context can be provided by the title, or there may be specific operating contexts provided for each right, or a combination of these approaches may be utilized. Among the above-described embodiments, additional embodiments include those in which the title includes at least one right that is associated with the operating context. Alternative additional embodiments include those for which the title includes at least one operating context that is associated with at least one right. If a plurality of operating contexts are provided, the resolver component in the operating environment is responsible for determining the effective operating context to use in processing the redeemed right.

Furthermore, each operating context, whether expressed as part of an operating environment or by a title, may be provided in a plurality of ways. In a first embodiment, the operating context may be "embedded", in which case, the operating context is present within the operating environment or title. In a second embodiment, an operating context may be "named" by the operating environment or title using a name or description suitable for the purpose. For example, a name might be a globally unique ID, a textual name, or a combination of a plurality of elements such as a textual name and a version number. A named operating context may be located and made available to the operating environment by use of a directory service, a name service, a database, or equivalent service in the operating environment such as a service router. Alternatively, an operating context may be referenced from an operating environment or a title using any supported referencing technology. Some well known technologies include an XPointer and a URI. If a plurality of operating contexts are expressed within a title, each operating context may be expressed using a similar or different means. The provisions of such operating contexts can be provided by those having ordinary skill in the art using this disclosure.

Figure 2:
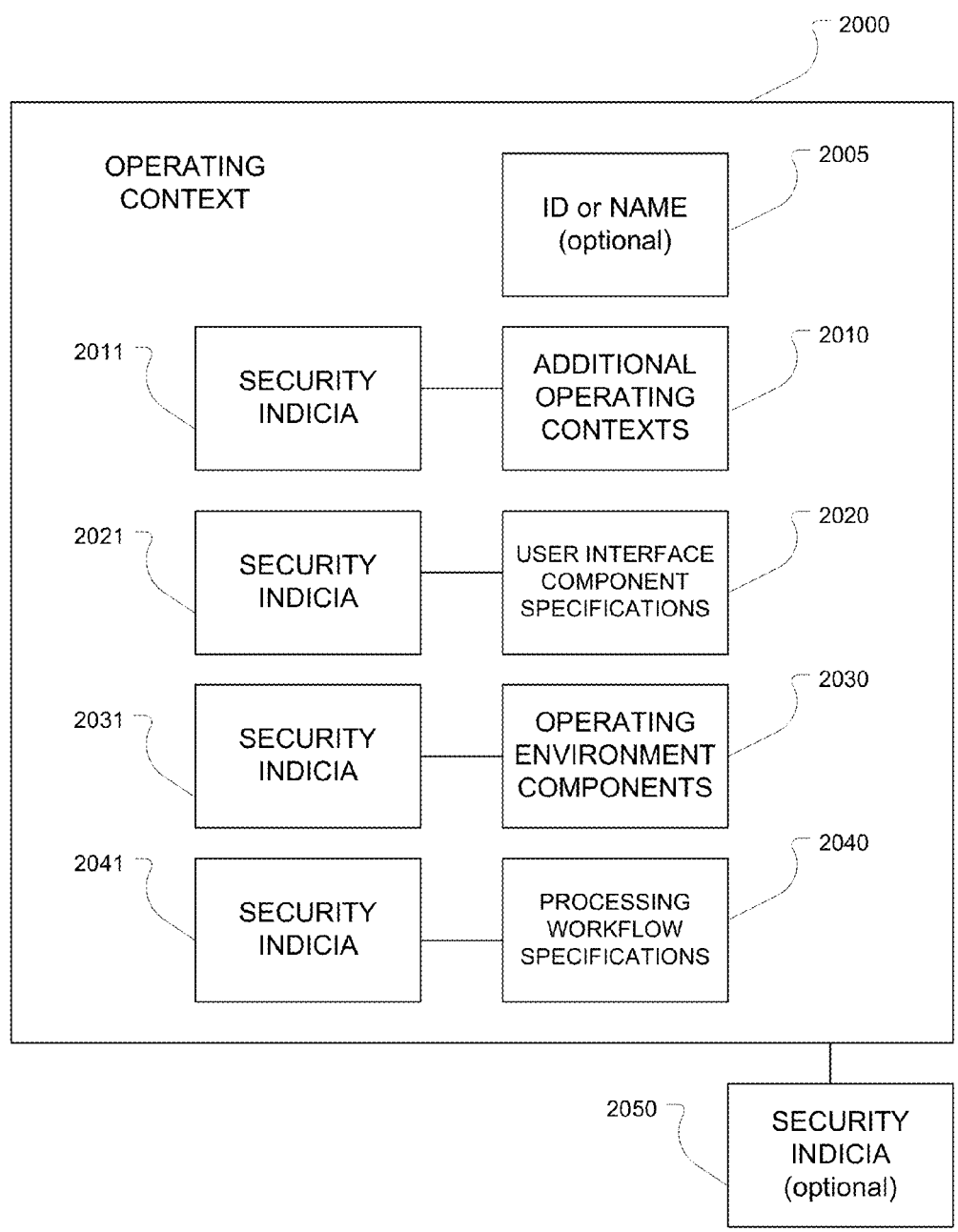
FIG. 2 is an illustration of an operating context implemented according to a specific embodiment of the invention.

An operating context is a data structure that specifies one or more aspects of an operating environment. FIG. 2 illustrates an exemplary representation of an operating context. Each operating context may be represented in any common format used for representing information. One such exemplary representation is an XML data structure such as is commonly used by those skilled in the art. Other representations, such as ASN.1, database tables, tag-value pairs, etc. may also be used without loss of generality.

Each operating context (2000) comprises zero or more instances of its component elements, each of which may be named, referenced, or included by embedding within the operating context. These component elements include an optional name or ID (2005), additional operating contexts (2010), user interface component specifications (2020), operating environment components (2030), and processing workflow specifications (2040). Each element reference may be accompanied by security indicia that may be used to verify its integrity (2011, 2021, 2031, 2041). Optional security indicia (2050) may be included for the operating context itself to permit the verification of the operating context itself.

An optional name or unique identifier may be included within each operating context in order to make the operating context uniquely identified. A preferred identification mechanism is to use a globally unique identifier such as a Microsoft GUID or a UUID as specified by DCE. Alternatively, a textual name may also be used, either in conjunction with the unique ID, or on a stand-alone basis.

Zero or more additional operating context specification (2010) may be included within an operating context. In some embodiments, these additional operating context specifications are embedded within the first operating context. In other embodiments, the additional operating context specifications may be named by the first operating context instead of being embedded within it. Alternatively, the additional operating context specifications may be named by the first operating context using any of the common referencing schemes mentioned herein. If a plurality of additional operating context specifications are included within a first operating context, each may use the same or different method selected from embedding, naming, or referencing. Each additional operating context specification included within an operating context may be accompanied by security indicia (e.g. 2041) useful in determining its authenticity and integrity.

Zero or more user interface component specifications (2020) may be included within an operating context. In some embodiments, these user interface component specifications are embedded within the first operating context. In other embodiments, the user interface component specifications may be named by the first operating context instead of being embedded within it. Alternatively, the user interface component specifications may be named by the first operating context using any of the common referencing schemes mentioned herein. If a plurality of user interface component specifications is included within a first operating context, each may use the same or different method selected from embedding, naming, or referencing. Each user interface component specification included within an operating context may be accompanied by security indicia (e.g. 2021) useful in determining its authenticity and integrity.

Zero or more operating environment components (2030) may be included within an operating context. In some embodiments, these operating environment components are embedded within the first operating context. In other embodiments, the operating environment components may be named by the first operating context instead of being embedded within it. Alternatively, the operating environment components may be named by the first operating context using any of the common referencing schemes mentioned herein. If a plurality of operating environment components is included within a first operating context, each may use the same or different method selected from embedding, naming, or referencing. Each operating environment component included within an operating context may be accompanied by security indicia (e.g. 2031) useful in determining its authenticity and integrity.

Zero or more processing workflow specifications (2040) may be included within an operating context. In some embodiments, these processing workflow specifications are embedded within the first operating context. In other embodiments, the processing workflow specifications may be named by the first operating context instead of being embedded within it. Alternatively, the processing workflow specifications may be named by the first operating context using any of the common referencing schemes mentioned herein. If a plurality of processing workflow specifications is included within a first operating context, each may use the same or different method selected from embedding, naming, or referencing. Each processing workflow specification included within an operating context may be accompanied by security indicia (e.g. 2041) useful in determining its authenticity and integrity.

Optional security indicia (2050) may be included for the operating context itself to permit the verification of the authenticity and integrity of the operating context itself. Security indicia in an operating context may be any indicia that may be used to verify the integrity of the referenced component. Often, this is a checksum, digital hash, or digital signature.

An operating environment constructed in accordance with an operating context as described above is said to be "defined". Operating environments may be check-summed or digitally signed using well known methods, and these security indicia may be checked when an operating environment is assembled. If the environment is assembled without the use of an operating context, but the security indicia associated with the operating components are checked to assure their integrity, the operating environment is said to be "assured". In some embodiments, the security indicia of one or more operating contexts may be used to verify each component as the operating environment is provided to ensure that the operating environment provided has not been tampered with or otherwise corrupted. Operating environments that are defined using an operating context and are constructed using the security indicia of an operating context to verify their integrity are said to be "defined+assured".

In more specific embodiments, any one of the operating contexts described above is combined with any one of the operating environments just described, i.e., one of each operating context (embedded, named, and referenced) is combined with one of each operating environment (assured, defined, and assured and defined) to provide an embodiment of the present invention for each of the 3×3=9 different combinations. In still more specific embodiments, the operating environment is both assured and defined by an operating context. Again, the provision of such operating environments can be accomplished by those having ordinary skill in the art using this disclosure.

Each operating environment may be statically configured, in which the configuration of the components is not changed using an operating context. This implementation model is straightforward and provides title processing within fixed operational constraints. Some business models require different configurations, and these configurations may be accommodated using a plurality of operating environments, each statically configured in a different manner. As is clear to the reader, this deployment model scales poorly. A second deployment option is to use operating environments that are dynamically configured using an operating context. In this model, the operating components are all instantiated, but are only referenced and used on an as needed basis. This model, while more flexible, also scales poorly across a plurality of devices and device types. Dynamic configuration often requires a priori knowledge of workloads and system performance dynamics that are often not precomputable. Similarly, dynamic configuration mechanisms introduce issues of component distribution and whether all needed components are available at the time they are needed. A third alternative, the dynamic loading and unloading of components based upon an operating context is also provided. In this alternative model, operating environment components need not be instantiated until they are actually needed by a specific operating environment. Each operating environment may be constructed using components which are not running prior to the creation of the operating environment, which are instantiated as they are needed, and are unloaded as soon as they are used. When coupled with the ability of an operating context to embed one or more components, this provides for a portable, assured, and defined system for the processing of titles. This technology thus permits the digital bearer nature of titles to be fully expressed to the point that they can be processed immediately by a bearer. Again, the provision of such operating environments can be accomplished by those having ordinary skill in the art using this disclosure.

Still other embodiments include those of each of the above-described embodiments in which the operating environment is further configured to review said operating context upon presentation of a title. In more specific embodiments, the operating environment is configured with a resolver or controller component capable of determining whether the operating environment can process said at least one right expressed by the title. In still more specific embodiments, the operating environment is configured to determine whether one or more additional objects require configuration or instantiation to enable the operating environment to process said at least one right. In yet more specific embodiments, the operating environment is further configured to configure or instantiate one or more additional objects required to enable said operating environment to process said at least one right. As described below, this component is called a Controller. In some embodiments, the functions of Controller and Resolver are combined into a single component.

According to specific embodiments, the present invention provides methods for processing digital bearer instruments and computer-readable program code devices that are configured to implement such methods (i.e., software). The context is configured to provide an operating environment effective to process at least one right, and is further selected from the group consisting of: embedded, named, and referenced operating contexts; and said operating environment being selected from the group consisting of: assured, defined, and assured+defined operating environments.

Active User Interface

Yet other embodiments of the above-described systems, methods, and software provided by the invention further comprise a user interface that is configured to allow a user to interact with the above-described operating environment. In some embodiments, the user interface further includes a slide-out window. In more specific embodiments, the above-described operating context is used to specify or control aspects of the configuration of the user interface. In other more specific embodiments, the user interface is configured to provide a presentation that is substantially coordinated with at least an aspect of said title.

In some embodiments of the invention, the user interface design and implementation is structured and has a well-defined set of interface specifications. In some embodiments, the user interface implements an operating context model that can securely and dynamically load operating environment components on an as-needed basis. In more specific embodiments, a collection comprising an operating context and one or more components is called a Operating context. A Operating context defines the user interface requirements and standards, provides a standard set of controls, and describes a variety of specified components for processing one or more aspects of a title. Examples of specified components implement features of the User interface, including, for example, the Wallet, My Stuff, and Shopping Cart functions described below. A Operating context implemented model improves load-time performance for users, and increases the security and flexibility of the User interface. Furthermore, a User interface can coordinate the use of external services and integrate the use of external services within defined user interface requirements and standards. Such User interfaces can be provided using methods known to those having skill in the art.

As shown in FIG. 1, in one embodiment, the User interface architecture includes at least one User interface, one or more operating contexts, optional application plug-ins, associated application interface logic, an optional communications manager, and optional external services. In more specific embodiments, the User interface architecture may be deployed using servers, desktop and portable (laptop) computers, mobile devices (including, but not limited to, cell phones, PDAs, and music players), and embedded devices such as set top boxes, DVRs, and home entertainment controllers such as Microsoft's Media Center. Portions of the User interface architecture may be deployed on different systems in differing ways as determined by the implementation requirements. Such User interfaces can be provided using methods known to those having skill in the art.

In other embodiments, the User interface architecture provides for the use of services and components that effect the provision of title expressed right processing operations across the architecture. More specifically, the User interface architecture extends title expressed right processing operations to an arbitrary user interface presented upon a user interface device of a user's choice.

In some deployments, the User interface architecture may be deployed as one or more application programs that operate within an extant processing environment such as Windows XP or Java Runtime Environment. In some cases, portions of the User interface architecture may be embedded within other third party applications present in these environments, or portions of the User interface architecture may directly embedded within said extant operating system and may be used, in part, to fulfill title expressed right processing requests to the operating system. In other embodiments, portions of the User interface architecture may serve as the underlying operating system when implemented upon specific devices. Such User interfaces can be provided using methods known to those having skill in the art.

As described above, the User interface architecture comprises at least one User interface. In most embodiments, the User interface architecture includes a user interface operating on the currently in-use device (the device the user is currently using). Alternate embodiments are envisioned where the User interface operates upon a device other than the currently in-use device and communicates the user interface components to the currently in-use device using a protocol such as RDP or HTTP. Such User interfaces can be provided using methods known to those having skill in the art.

In one embodiment, the User interface is a desktop application. In such an embodiment, the Active User interface may be implemented using a development platform such as Macromedia's Flash MX 7, although it may be developed using any commercially available application development platform, including alternative versions of Macromedia's Flash such as Flash Lite, or alternative development platforms such as J2ME and BREW. Other platforms, such as FLEX, may also be employed. Alternative versions of the User interface may also be developed for specific deployments. These versions of the User interface architecture may be developed using platform specific development tools such as Windows .NET, commercially available from Microsoft. Such User interfaces can be provided using methods known to those having skill in the art.

A user interface may be invoked in several ways. In a first embodiment, the User interface is invoked by the user when they select a user interface-enabled indicator on a web site or as part of an advertising banner. In other exemplary embodiments, the User interface may be invoked when the user selects an application link that identifies an instance of a user interface to be run. Alternatively, the User interface may be directly called by an external applications program or web site, or may be started based upon recognition of specific received content. Examples of the latter may include starting the User interface on the basis of a file type association, MIME type, or upon receipt and recognition of a title, upon receipt an out-of-band communications media such as e-mail or instant messaging containing a title. Another example is distribution of content on a network such as P2P in a format that can be recognized and invoked by client applications such as P2P applications. These files are distributed in a format recognized by the application. When opened, the application displays the contents, at least in part using User interface. Alternatively, the User interface may be invoked at device startup and may be always running. In implementations where User interface functionality is embedded in other applications or operating system components, the User interface and its components may be directly called by the applications (such as a media player licensing interface) or by operating system components within which the User interface is embedded. For example, a user interface may be invoked by the Microsoft Media Player license acquisition page. Alternatively, the User interface may be involved by a file browser such as Windows Explorer. Such User interfaces can be provided using methods known to those having skill in the art.

In some embodiments, the user interface provides a title expressed right processing environment. As user herein, a title expressed right processing environment is a substantially complete operating context for the processing of operating contexts, components, and services that are combined by the User interface to produce a customizable title expressed right processing environment. The User interface combines user interface, service, and workflow specifications with implementation components in the form of services, components, and user interface elements to produce a seamless, repeatable, and secure user experience. In some embodiments, a user interface cannot provide a complete title expressed right processing environment, and so is limited to providing a subset of a complete title expressed right processing environment required for processing. This subset of a complete title expressed right processing environment is called an operating context.

The Active User interface provides flexibility in the title expressed right processing environment it provides. The Active User interface may cause the demand-load and unload of portions of the title expressed right processing environment on an as-needed basis. Similarly, the Active User interface or a title expressed right processing environment may distribute its workload as needed. In some instances, portions of the title expressed right processing environment and of other architectures that the Active User interface relies upon, may be distributed to alternate systems or devices. Similarly, service requests may be mediated by the User interface, and directed to a local instance of a service provider, may be passed to a remote service instance, or a combination of both approaches may be performed. For example, the operating environment may rely on an internal identity management component, may distribute the identity management component to another system, or may use a combination of both methods. Such User interfaces can be provided using methods known to those having skill in the art.

In order to ensure the proper functioning of the Active User interface, the operating environment may perform validation and verification of demand-loaded and/or distributed components. Demand-loaded components are also referred to herein as plug-ins. In some cases, these validation and verification may be performed by the User interface itself using well-known cryptographic means such as cryptohashes such as those generated by MD5, a checksum or CRC, or by using methods such as self-validating packaging such as Microsoft's CAB or Java's signed JAR files. In alternate embodiments, the User interface components may be validated using SAML assertion(s) in accordance with SAML specifications. Such User interfaces can be provided using methods known to those having skill in the art.

In other embodiments, the validation and verification functions may be performed by underlying operating system functions. For example, the validation and verification of signed applications is provided by the underlying task loader in the Windows XP and Windows CE operating systems, and in the Java runtime environment. The User interface may be configured to rely on these services when executing upon these operating systems that provide this functionality.

According to some embodiments, the User interface is also cryptographically protected against tampering, and is validated and verified using techniques and processes similar to those described above prior to use.

In some embodiments, the user interface provides aspects of service management, marshalling, and service directory capabilities to the title expressed right processing environment. These aspects may include any of provision of aspects directory services (and service description), service management, identity management, title processor, display panes, and communications/session management. In other embodiments, the User interface provides service orchestration capabilities. In still other embodiments, one or more of these aspects are provided by the User interface itself, are provided by a component to the User interface, are provided by underlying operating system components, or are provided by remotely hosted services.

In some embodiments, the User interface implements a component called a Controller. In other embodiments, the functions of a Controller may be implemented as a separate service, either as a loadable component, or as an external service. A Controller is part of the title expressed right processing environment that manages the components of a title expressed right operating environment, and provides the interface and "glue" logic between at least one User interface and other services. A controller interacts with other services, such as those described below, to provide the user and service interactions to implement the specified interface and service calls necessary for the specified execution within a title expressed right processing environment or operating context.

In more specific embodiments, the Controller is used to control flows, views, validation, and similar interface functions. In some embodiments, the controller component is used to transform data flows from one format to another so they may be used within an existing specification. Part of the Controller specification may define views, languages, and protocols for communicating with other service components about the user interface. The view specification defines, in part, the layout, styles, user interface components, and the like to be used when displaying the output from a title expressed right processing environment, operating context, or external service. For example, when an output of one service is received, the controller may transform or change the format of the output to better fit within the display pane in which it is mapped. Part of the definition may include a "form" definition, that optionally specifies how the elements of the "form" may be validated by the User interface. In this case, the User interface may perform direct validation of entry fields using the form specification rather than rely on the Controller or other services for validation. This capability provides improved response times to the user and offline operation capabilities. The Controller specifies how the form and the elements can be validated, for example, using a regular expression (e.g. regex) or indication of a remote service to be used (such as phone number validation, location validation, etc.). This can be accomplished using methods known to those having skill in the art.

In other embodiments, a Controller component specifies, collects from the user or other location in the system, or manages the authentication and authorization information to be used when accessing specific services or components within a title expressed right processing environment or operating context. This can be accomplished using methods known to those having skill in the art.

In other embodiments, the User interface provides, or causes to be provided, a service called a Resolver. In other embodiments, the functions of a Resolver may be implemented as a separate service, either as a loadable component, or as an external service. A Resolver verifies aspects of a title, including aspects of operating contexts and of title structures. If there are conflicts or ambiguities in the specifications within an operating context or title structure, the Resolver is responsible for resolving the conflicts or ambiguities in a manner that permits the processing of the title to continue. In some embodiments, the functions of the Resolver and the Controller are combined in a single service or component.

In still other embodiments, the Active User interface provides, or causes to be provided to a title expressed right processing environment or operating context, directory services which identify the location, services, and required calling parameters for one or more services. In some cases, the Active User interface provides this directory of services, in others it redirects requests for directory service to a service that in turn provides these services. Alternatively, the Active User interface may determine which of multiple available directory service options should be used to fulfill a request. Such Active User interface functions can be provided using methods known to those having skill in the art.

In more specific embodiments, the Active User interface provides, or causes to be provided to a title expressed right processing environment, a service manager which manages components and external services. The service manager may be implemented as part of the Active User interface itself, or may be implemented as a plug-in, or as an external service within a title expressed right processing environment. A service manager supports, in conjunction with other components of a title expressed right processing environment, the demand loading and unloading of components, including any verification and validation requirements. In some embodiments, the service manager functionality is contained within other title expressed right processing environment components. Optionally, a service manager coordinates with an underlying operating system component to ensure these functions are performed as required to enable a title expressed right processing environment.

In some cases, the Active User interface provides, or causes to be provided as part of a title expressed right processing environment an identity management service. The identity management service may be implemented as part of the User interface itself, or may be implemented as a plug-in, or as an external service. An identity management service provides methods for validating components of the User interface architecture to ensure that they have not been tampered with and that their use is authorized within a specific instance of a title expressed right processing environment. Such User interfaces can be provided using methods known to those having skill in the art.

In some embodiments, the Active User interface additionally provides services that support the processing of titles. The title processor may be implemented as part of the Active User interface itself, may be implemented as a plug-in, or as one or more external services, or as part of an externally defined title expressed right processing environment. A title processor supports the use of titles as authorization or authentication mechanisms that may be used to control aspects of a title expressed right processing environment.

In still other embodiments, the Active User interface manages at least one display pane that is used by the Active User interface component, a title expressed right processing environment, its associated components, and external services to display service options to a user and to collect and process input from the user. A display pane is a unique portion of a display, including a window or portion of a window, used as part of an input-output operation supporting the interaction between a user and a component of a title expressed right processing environment. A screen of a display, a popup window, a slide-out or drawer display portion, and an application-defined form are all examples of a display pane. A display pane may be uniquely associated with a specific application, component, or service or it may be shared between one or more applications, components, or services. In one example implementation, the Active User interface may implement a display pane that provides an XForms compliant display. In other example implementations, other display technologies such as SMIL or XAML may be implemented as panes. Alternatively, the Active User interface may provide display panes that respond to a plurality of display technologies, and may provide a plurality of display panes that respond to one or more disparate display technologies. Such Active User interfaces can be provided using methods known to those having skill in the art.

In other embodiments, the communications/session management component of the Active User interface manages the communications between the Active User interface components and components of a title expressed right processing environment. This component is sometimes called a connection manager. Different connection managers may be provided to support different protocols, for example, a user interface may simultaneously support a connection manager that supports the SOAP protocol, one that supports an RPC over HTTP protocol, and yet another that supports SHTTP. The connection manager is preferably implemented as discrete components, but may be implemented as a single component in some implementations. The communications management component optionally includes the capability to orchestrate the completion of one or more services on behalf of the Active User interface.

The Active User interface may optionally comprise additional program logic to permit the direct integration of the Active User interface with one or more third-party applications or operating systems. This integration logic provides an interface between application and operating system calls and the Active User interface services, components, and other components of the Active User interface architecture. Such Active User interface functions can be provided using methods known to those having skill in the art.

In some embodiments, configuration information and other specifications are provided using structured definitions, such as those provided when using an XML structure. It should be noted that XML structures are described herein for exemplary purposes. However, it is understood that other representations of the information are possible, and in some cases, desirable or advantageous based upon implementation dependent characteristics of each specific method of use.

Operating Contexts and the Active User Interface

The set of resources required and/or desired to provide an aspect of a specific title expressed right processing environment, including but not limited to services, directories, components, applications, display panes, and user interface is called an operating context of the User interface architecture. A operating context is an alternate embodiment of a subset of the elements named by an operating context and describes at least one aspect of an operating context, and names, describes, references, or includes services, directories, applications, components, and user interface components required to provide the desired operating context and user interface.

The operating context that the Active User interface should use for a specific title expressed right processing environment or operating context may be defined by the Active User interface configuration, by embedded operating context, by the location from which the Active User interface is invoked, or by a title requesting User interface services.

One or more operating contexts may be simultaneously referenced by and/or used by an Active User Interface. A user interface that references a operating context may locate and load a operating context in a variety of ways. First, it may have a well-known storage location from which it loads a operating context. For example, a user interface may load a operating context from a local disk or memory store, an external disk or memory store, including an external repository site, or the User interface may look up the location of a operating context using a directory service, and then obtain a operating context either from the directory service, or from a third party source by using information provided by the directory service. Operating contexts that are loaded from locations external to a user interface where they may be subject to tampering may be optionally verified and validated using techniques similar to those described above for verifying and validating User interface title expressed right processing environment components.

In some embodiments, a plurality of operating contexts may be loaded and simultaneously operate within a Active User interface, each used to define a disparate title expressed right processing environment. In other embodiments, the User interface operates on a single operating context at a time. A single operating context may be used to define a specific operating context, or a plurality of operating contexts may be combined to define an operating context. The User interface optionally may have a default operating context associated with it. If such a default operating context is specified, the User interface uses the specified default operating context in the absence of other operating context specifications.

A operating context may be specifically associated with a collection of services that comprise at least part of a title expressed right processing environment. A specific operating context may be associated with a specific service, Digital Commerce Engine (DCE), or DCE component. The association between a specific service or services and a specific operating context may be made on the basis of a configuration specification, a service specification, specified by the service, or based upon the information returned from an external service. One example of such an external service that may provide information describing a required operating context is an identity provider. The Active User interface, and attendant operating context specifications, defines the binding between backend services, UI and customer-facing application components, and binds these services and components with a specific look-and-feel. This binding facilitates a unified and homogenous user experience.

UI Specifications

A operating context specification of the view portion of a UI specification comprises one or more optional properties. Each optional property describes an attribute of the operating context, such as an identifier, a version, a unique name, a rights specification, a localization specification, and a unique location reference such as a URL. Some or all of these properties may be present in a specific instance of a operating context. A operating context may also reference one or more additional operating contexts in order to specify additional portions of a title expressed right processing environment. Alternatively, the operating context may specify one or more name aliases. In some embodiments, a operating context may specify a property that provides for the cryptographic authentication of the operating context itself. Such a property may comprise a cryptographic hash or digest, such as those produced by well known algorithms such as MD5, or may embody a SAML artifact, or a reference to a service that can provide the authentication materials.

Each operating context optionally comprises specification of, reference to a view specification, or reference to a hierarchical definition that taken together, comprise the specification for one or more views. Each view specification optionally specifies at least one style sheet to use, at least one skins definition, an optional task map, including the optional specification of at least one component to be loaded, and optionally defines permitted process flows.

Views, Skins and Style Sheets

In some embodiments, the views, skins, and style sheets collectively define the look and feel of the user interface component presented by the Active User interface on behalf of services operating in the context of a title expressed right operating environment. A view defines layout parameters, form objects, and presentation panes. Skins define the presentation attributes and defines common style and presentation elements, and style sheets define the appearance of the items presented (e.g. font, button shapes, colors). Collectively, views, skins, and style sheets define the following UI attributes:

A style sheet may define some or all of the following properties:
  a. Fonts
  b. Messages
  c. Dialogs
  d. Labels
  e. Colors
  f. Branding Elements
  g. General flows
  h. Real estate use
  i. Windows
  j. Menus
  k. Forms
  l. Layout
  m. Help Views, skins, style sheets may be layered and combined, providing a mechanism such that a base style sheet may define common fonts, colors, and real estate use, and subsequent style sheets may define menus, forms, help, and other service-specific features.

Each view is named with an optional property. This property can be a unique identifier such as a globally unique ID (GUID) as known to those skilled in the art, or it can be a unique URI that uniquely defines the view.

An example view specification is shown below:

```
- <!-- Login View XML -->
- <Form class="ViewXMLParser">
- <Screen title="[ls]Title.label">
    <Div
        id="c1"
        compClass="Label"
        style="Label:titleBar"
        text="[ls]Title.label" />
    <Div
        id="Space1"
        compClass="SpaceBar" height="7" color="0xFFFFFF"
        _alpha="0" />
    <Div id="c4" compClass="Label"
```

```
            text="[ls]Username.label" />
        <Div id="c5" compClass="Input" mapOut="Username"
        mapIn="Username" />
        <Div id="c7" compClass="Label"
            text="[ls]Password.label" />
        <Div id="c8" compClass="Input" mapOut="Password"
        password="true"
        <Div id="Space2"
            compClass="SpaceBar" height="7" color="0xFFFFFF"
            _alpha="0" />
        <Div id="cC"
            compClass="Line" style="Line:dashed" />
        <Div id="Space3"
            compClass="SpaceBar" height="7" color="0xFFFFFF"
            _alpha="0" />
        <Div id="cD"
            compClass="Link" action="RecoverPassword"
            label="[ls]Links.lost" />
        <Div id="regLink"
            compClass="Link" action="register"
            label="[ls]Links.register" />
      <Div id="cH"
            compClass="BaseBar"
            style="BaseBar">
        <Param id="b1"
            type="BaseBar_Button"
            label="[ls]login.label"
            action="submit?login"
            style="BaseBarDefault" />
        <Param id="b2"
            type="BaseBar_Button"
            label="[ls]cancel.label"
            action="cancel" />
      </Div>
    </Screen>
  </Form>
```

In some embodiments, skins and style sheets are used to define the look and feel of the Active User interface. Each skin and style sheet is named with an optional property. This property can be a unique identifier such as a globally unique ID (GUID) as known to those skilled in the art, or it can be a unique URI that uniquely defines the skin or style sheet. For example, the "skin" features of the user interface can be used to create a specific look-and-feel as well as support variations in process flow for a variety of user interfaces and external services. This can include both portrait and landscape versions, as well as control over the colors and components that are supported. In one embodiment, the "skin" may be in part defined using an XML structure, although alternative definition approaches may be used where appropriate. An example skin definition is shown below:

```
<Skin class="GenericXMLParser">
- <!--
  NOTE: all elements of type="path" are used as variables within the
operating context
  -->
- <!-- Path implies the directory where the was served from -->
- <!-- Proto is used by buildscripts, please DO NOT REMOVE -->
  <Param
      id="Root"
      type="path"
      value="[Proto]://builder.navio.com/tts/av/" />
  <Param
      id="DCEPath"
      type="path"
      value="[Proto]://builder.navio.com/tts/" />
  <Param
      id="DAXPath"
      type="path"
      value="http://daxweb.org/ns/1.0/" />
  <Param
      id="DAXIcon"
      type="path"
      value="[DAXPath]taxonomy/Product Type/" />
  <Param
      id="TaskPath"
      type="path"
      value="[Root]tasks/" />
  <Param
      id="Locals"
      type="path"
      value="[Root]tasks/" />
  <Param
      id="default_language"
      value="US" />
  <Param
      id="application_long_name"
      value="User interface" />
  <Param
      id="servlet_map"
      value="[Path]ServletMap.xml" />
- <!-- Loads a map of all services used by the operating contexts
connection manager -->
  <Param
      id="Version"
      value="VALUE" />
- <!-- Builds the initial UI layer for the operating context -->
  <Clip
      target="/ui" />
- <!-- Creates a hidden layer inside the operating context for loading
component classes/classes -->
  <Clip
      target="/classes" _visible="false" />
- <!-- Loads utility classes into the operating context -->
  <Clip
      target="/classes/plugins/utils"
      src="[Root]plugins/utils/utils.swf" />
- <!-- Plugins into the operating context -->
  <Clip
      target="/classes/plugins/js" src="[Root]plugins/js/Connector.swf" />
  <Clip
      target="/classes/plugins/master_event"
      src="[Root]plugins/master_event/MasterEvent.swf" />
  <Clip
      target="/classes/plugins/dce"
      src="[Root]plugins/dce/DCE.swf" />
  <Clip
      target="/classes/plugins/parsers"
      src="[Root]plugins/parsers/parsers.swf" />
  <Clip
      target="/classes/plugins/localization"
      src="[Root]plugins/localization/Localization.swf" />
  <Clip
      target="/classes/plugins/fonts"
      src="[Root]fonts.swf" />
  <Clip
      target="/classes/plugins/icons" src="[Root]plugins/img/icons.swf" />
  <Clip
      target="/classes/plugins/parsers"
      src="[Root]plugins/parsers/parsers.swf" />
  <Clip
      target="/classes/plugins/packager"
      src="[Root]plugins/packager/packager.swf" />
  <Clip
      target="/classes/plugins/img"
      src="[Root]plugins/img/icons.swf" />
  <Clip
      target="/classes/plugins/user_manager"
      src="[Root]plugins/user_manager/UserManager.swf" />
  <Clip
      target="/classes/plugins/cart" src="[Root]plugins/cart/Cart.swf" />
  <Clip
      target="/classes/tasks/"
      src="[Path]plugins/tasks/tasks.swf" />
  <Clip
      target="/classes/plugins/tooltip"
      src="[Root]plugins/tooltip/tooltip.swf" />
</Skin>
```

Alternatively, a set of skins may be used by the User interface to define the overall look and feel of the application, including any application specific components. In the example skin definition shown below, the skin defines an alternate UI component called the drawer. The drawer "pulls" out to provide an additional display pane for displaying specific information.

```
<Skin class="GenericXMLParser">
    <Param id="location0" value="23" />
    <Param id="location1" value="343" />
    <Param id="location2" value="610" />
- <!--
    THIS IS THE CUSTOM SKIN THAT IMPLEMENTS THE NIO
OVERALL LOOK-AND-FEEL OPERATING CONTEXT INCLUDING
THE DRAWER
    -->
    <Clip target="/ui/drawer/" src="[Skin]drawer.swf" />
    <Clip target="/ui/drawer/main/R1"
    class="com.navio.tasks.RootManager"
defaultApp="Home" x="10" y="32" width="247" height="340"
style="R1" />
    <Clip target="/ui/drawer/d/R2"
    class="com.navio.tasks.RootManager"
defaultApp="Login2" x="84" y="32" width="247" height="340"
style="R1" />
- <!--
<Clip target="/ui/drawer/e/R3" class="com.navio.tasks.RootManager"
defaultApp='MyStuff' x="600" y="420" width="350" height="450" />
    -->
    </Skin>
```

A style sheet may be a CSS style sheet, or may be an alternative structure that serves the same purpose. Style sheet usage and construction is understood by those skilled in the art.

Task Map

In some embodiments, a task map is used within an operational context to provide a map between specific distributed workflow operations and specific services or application components (either plug-in or built-in). For example, a task map may identify the shopping cart application component to be used in a specific implementation, and may further identify the application components, layouts, and styles to be used when working with this component.

A task map comprises one or the following elements:
Property/attributes
Identification
View identification
Package identification
Task name
View specification.
Optional localization/internationalization specification,
Application specifications
Application component specifications
Task definitions
Default package path
Error handling A task map identifier may comprise a unique ID or name, consistent with other unique ID and name descriptions within the Active User interface architecture.

A task map may comprise one or more task specifications. Each task specification may include optional specifications for task names, view specifications, package specifications, skin specifications, style sheet specifications, and locale specifications. A task name provides a descriptive name for the task, such as "Accountless checkout." A task may be associated with a specific title expressed right action, a group of title expressed right actions, or an entire operating context.

A view specification provides a specification for the look and feel for the task. Preferably, the view specification is provided in the form of an XML specification as described above. The view specification may be identified with a view identification. A view identification may comprise a unique ID or name, consistent with other unique ID and name descriptions within the User interface architecture.

A package identification may comprise a unique ID or name, consistent with other unique ID and name descriptions within the User interface architecture.

An optional localization/internationalization specification specifies the localization parameters to be used for this task. This specification may be expressly specified, or may reference a style sheet specification. In embodiments where the localization/internationalization specification is provided, there are several mechanisms available. In one embodiment, the application may follow ISO conventions for specifying various sets of localization parameters. For example, the language code may use the ISO default for "US English".

An application component specification names or describes a user interface component (either built-in, plug-in, or external service) that provides application services for this task. User interface component references may take the forms described herein, or may take other forms appropriate to the implementation system or platform. In various embodiments, the application component specification may be a DLL or COM object, a Java class, an application operating context such as a JAR, a CORBA object ID, a service identifier or specification, or other implementation dependant method of identifying the specific application component desired. Optionally, the application component specification may specify the calling and response interface for the application component. In some embodiments, the application component specification comprises a reference to an external service enabled for the processing of title-based rights.

The task class specifications may define alternate application components or methods of specific application components that should be associated with specific distributed workflow components. For example, the task class specification may define a specific "Thank You" screen for the "Accountless checkout" task. It defines a specific application component, view, and other presentation information with a specific "Thank You Screen" as a distributed workflow event within the task manager. Upon receipt of the "Thank You Screen" distributed workflow event, the User interface causes the application component to be executed within the specified operating context.

A title (or other application component may, indirectly through its view) may specify a operating context it requires in order to provide a title expressed right processing environment. If the User interface, operating on behalf of the title is unable to locate and successfully load a specified operating context, component, or remote service, the error handler UI is invoked in accordance with the current error handler UI specification. The error handler used is the error handler associated with the current operating context, or if an error handler is not specified for the current operating context, the error handler of a parent task map or operating context, or the error handle for the default operating context is used (if defined).

In one example embodiment, a user has rights to both child and adult content. If the user is operating within a branded (for adult content) title expressed right processing environment, the operating context specification for a piece of child content may require a change in context to a different operating context (either within the same title expressed right processing environment, in a different title expressed right processing environment, or in an operating context) before permitting the user interaction to continue.

An example task map is provided below:

```xml
<Taskmap>
    <AddAddress view="" package="[TaskPath]shared.swf" />
    <AddCreditCard view="" package="[TaskPath]shared.swf" />
    <Address view="[TaskPath]Shared/Address.xml"
            package="[TaskPath]shared.swf"
            locals="[TaskPath]Shared/Address" />
- <!-- Checkout -->
        <Cart package="[TaskPath]Cart/cart.swf"
            view="[TaskPath]Cart/Cart.xml" />
          <CreditCard view="[TaskPath]Cart/CreditCard/CreditCard.xml"
            package="[TaskPath]Cart/cart.swf" />
        <CreditCard_Confirm
            view="[TaskPath]Cart/CreditCard/CreditCard_Confirm.xml"
            thankyou_actless="[TaskPath]Cart/CreditCard/CreditCard_ThankYou_actless
            .xml"
            thankyou_actless_mobile="[TaskPath]Cart/CreditCard/CreditCard_ThankYou_
            actless_mobile.xml"
            thankyou="[TaskPath]Cart/CreditCard/CreditCard_ThankYou.xml"
            thankyou_mobile="[TaskPath]Cart/CreditCard/CreditCard_ThankYou_mobile.x
            ml"
            confirm="[TaskPath]Cart/CreditCard/CreditCard_Confirm.xml"
            actless="[TaskPath]Cart/CreditCard/CreditCard_Confirm_actless.xml"
            package="[TaskPath]Cart/Cart.swf" />
        <AddCreditCardAddress
            actless="[TaskPath]Cart/CreditCard/AddCreditCardAddress_actless.xml"
            view="[TaskPath]Cart/CreditCard/AddCreditCardAddress.xml"
            package="[TaskPath]Cart/cart.swf" />
        <Cash view="[TaskPath]Cart/Cash.xml"
            package="[TaskPath]Cart/cart.swf" />
        <Pin
            view="[TaskPath]Cart/Pin.xml"
            package="[TaskPath]Cart/cart.swf" />
        <ActiveVoucher
            package="[TaskPath]Cart/cart.swf"
            view="[TaskPath]Cart/ActiveVoucher.xml"
            cart="[TaskPath]Cart/ActiveVoucher_cart.xml" />
        <Activation
            package="[TaskPath]Session/Session.swf"
            view="[TaskPath]Session/Activate.xml"
            locals="[TaskPath]Session/Activate" />
- <!-- Cart Confirm/Thankyou -->
        <CheckOut
            view="[TaskPath]Cart/Checkout.xml"
            package="[TaskPath]Cart/Cart.swf" />
          <Survey view="[TaskPath]Cart/Survey.xml"
            package="[TaskPath]Cart/Cart.swf" />
- <!-- CarrierBilling Confirm/Thankyou -->
- <!--
<CarrierBilling view="[TaskPath]Cart/CarrierBilling/CarrierBilling.xml"
actless="[TaskPath]Cart/CarrierBilling/CarrierBilling_actless.xml"
package="[TaskPath]Cart/cart.swf"/>
        -->
<CarrierBilling_Confirm
            view="[TaskPath]Cart/CarrierBilling/CarrierBilling_Confirm.xml"
            confirm="[TaskPath]Cart/CarrierBilling/CarrierBilling_Confirm.xml"
            gsmNumber="[TaskPath]Cart/CarrierBilling/CarrierBilling_gsmNumber.xml"
            thankyou_actless="[TaskPath]Cart/CarrierBilling/CarrierBilling_ThankYou
            _actless.xml"
            thankyou="[TaskPath]Cart/CarrierBilling/CarrierBilling_ThankYou.xml"
            package="[TaskPath]Cart/Cart.swf"
            actless="[TaskPath]Cart/CarrierBilling/CarrierBilling_Confirm_actless.x
            ml"
            sprint_actless="[TaskPath]Cart/CarrierBilling/CarrierBilling_Confirm_ac
            tless_sprint.xml"
            sprint="[TaskPath]Cart/CarrierBilling/CarrierBilling_Confirm_sprint.xml
            " />
- <!-- Mobile Input -->
    <Input_Mobile
            package="[TaskPath]Cart/Cart.swf" />
        <GsmNumber
            view="[TaskPath]Cart/CarrierBilling/CarrierBilling_gsmNumber.xml"
            package="[TaskPath]Cart/Cart.swf" />
        <PhoneSelector
            package="[TaskPath]Cart/cart.swf"
            view="[TaskPath]Cart/PhoneSelector.xml" />
```

-continued

```xml
<!-- Cash Flow -->
<AddCash
        view="[TaskPath]Cart/Cash/AddCash.xml"
        actless="[TaskPath]Cart/Cash/AddCash_actless.xml"
        package="[TaskPath]Cart/cart.swf" />
<CashCC
        view="[TaskPath]Cart/Cash/CashCC.xml"
        package="[TaskPath]Cart/cart.swf" />
<CashCCAddress
        view="[TaskPath]Cart/Cash/CashCCAddress.xml"
        package="[TaskPath]Cart/cart.swf" />
<Cash_Confirm
        view="[TaskPath]Cart/Cash/Cash_Confirm.xml"
        confirm="[TaskPath]Cart/Cash/Cash_Confirm.xml"
        actless="[TaskPath]Cart/Cash/Cash_Confirm_actless.xml"
        thankyou_actless="[TaskPath]Cart/Cash/Cash_ThankYou_actless.xml"
        thankyou_actless_mobile="[TaskPath]Cart/Cash/Cash_ThankYou_actless_mobile.xml"
        thankyou="[TaskPath]Cart/Cash/Cash_ThankYou.xml"
        mobile_thankyou="[TaskPath]Cart/Cash/Cash_ThankYou_mobile.xml"
        package="[TaskPath]Cart/Cart.swf" />
<!-- /Checkout -->
<Contacts
        package="[TaskPath]roots.swf" />
<EditAddress
        view=""
        package="[TaskPath]shared.swf" />
<Get AddressInfo
        view="[TaskPath]Shared/AddCreditCard/AddCCInfo.xml"
        package="[TaskPath]package.swf" />
<GetCCInfo
        view="[TaskPath]Shared/AddCreditCard/AddCCInfo.xml"
        package="[TaskPath]package.swf" />
<GetViewData
        view="[TaskPath]Session/Login.xml"
        package="[TaskPath]Shared/Shared.swf" />
<Home
        view="[TaskPath]Home/Home.xml"
        guest="[TaskPath]Home/Guest.xml"
        guest_details="[TaskPath]Home/Guest_Details.xml"
        user="[TaskPath]Home/User_Details.xml"
        package="[TaskPath]Home/Home.swf" />
<Help
        view="[TaskPath]Help/Help.xml"
        package="[TaskPath]Help/Help.swf"
        src="[TaskPath]Help/HelpData.xml" />
<Inbox
        package="[TaskPath]roots.swf" />
<Logout
        view="[TaskPath]Session/Logout.xml"
        package="[TaskPath]Session/Logout.swf"
        locals="[TaskPath]Session/Session" />
<Message
        error="[TaskPath]Message/Error.xml"
        message="[TaskPath]Message/Message.xml"
        prompt="[TaskPath]Message/prompt.xml"
        package="[TaskPath]Message/Message.swf" />
<MyStuff
        view="[TaskPath]/MyStuff/MyStuff.xml"
        package="[TaskPath]roots.swf" />
<Phone
        view="[TaskPath]Shared/Phone.xml"
        package="[TaskPath]shared.swf"
        locals="[TaskPath]Shared/Phone" />
<Profile
        view="[TaskPath]Profile/Profile.xml"
        package="[TaskPath]Profile/Profile.swf"
        iden="[TaskPath]Profile/p_iden.xml"
        addy="[TaskPath]Profile/p_addy.xml"
        comm="[TaskPath]Profile/p_comm.xml" devi="[TaskPath]Profile/p_devi.xml"
        secu="[TaskPath]Profile/p_secu.xml" phon="[TaskPath]Profile/p_phon.xml"
        />
<QuickFlow
        package="[TaskPath]QuickFlow/QuickFlow.swf" />
<RecoverPassword
        secretQuestion="[TaskPath]Session/SecretQuestion.xml"
        secretAnswer="[TaskPath]Session/SecretAnswer.xml"
        thankYou="[TaskPath]Session/SecretThankYou.xml"
        package="[TaskPath]Session/RecoverPassword.swf" />
```

```
<ResetPassword
        view="[TaskPath]Session/ResetPassword.xml"
        thankYou="[TaskPath]Session/ResetThankYou.xml"
        package="[TaskPath]Session/ResetPassword.swf" />
<Session
        login="[TaskPath]Session/Login.xml"
        register="[TaskPath]Session/Register1.xml"
        register2="[TaskPath]Session/Register2.xml"
        register4="[TaskPath]Session/Register2.xml"
        register3="[TaskPath]Session/Register3.xml"
        activate="[TaskPath]Session/Activate.xml"
        package="[TaskPath]Session/Session.swf"
        locals="[TaskPath]Session/Session" />
<Wallet
        view="[TaskPath]Wallet/Wallet.xml"
        package="[TaskPath]Wallet/wallet.swf" />
- <!-- /Wallet -->
<AccountDetail
        view="[TaskPath]Wallet/AccountDetail.xml"
        package="[TaskPath]Wallet/wallet.swf"
        locals="[TaskPath]Wallet/AccountDetail" />
    <WalletCreditCardAddress
        view="[TaskPath]Wallet/WalletCreditCardAddress.xml"
        package="[TaskPath]Wallet/wallet.swf"
        locals="[TaskPath]Wallet/AccountDetail" />
<WalletCreditCard
        view="[TaskPath]Wallet/CreditCard.xml"
        package="[TaskPath]Wallet/wallet.swf"
        locals="[TaskPath]Wallet/CreditCard" />
<WalletDelete_Confirm
        view="[TaskPath]Wallet/Delete_Confirm.xml"
        package="[TaskPath]Wallet/wallet.swf"
        locals="[TaskPath]Wallet/Delete_Confirm" />
<WalletCash
        view="[TaskPath]Wallet/Cash.xml"
        package="[TaskPath]Wallet/wallet.swf"
        locals="[TaskPath]Wallet/Cash" />
<WalletAddCash
        view="[TaskPath]Wallet/AddCash.xml"
        package="[TaskPath]Wallet/wallet.swf" locals="[TaskPath]Wallet/AddCash"
        />
<VoucherDetails
        package="[TaskPath]Cart/cart.swf"
        view="[TaskPath]Cart/VoucherDetails.xml" />
<USAddress
        view="[Root]components/assets/USAddress.xml" />
</Taskmap>
```

Class Map

In some embodiments, the above-described UI components and UI elements are described by a class map. Display panes and other display components may be represented by UI specific methods, and optionally, components. In some embodiments, UI elements such as the "slide in/slide out drawer" element, trust indicators, and/or specific display elements may have special handlers that are called when the user accesses their UI. These methods and components are mapped to their specific display elements by the class map. In this way, a class map may be used to extend the user interface component(s) specified by an operational context. An example class map is provided below:

```
<Classmap>
- <!-- THIS FILE SPECIFIES THE COMPONENTS THAT ARE TO BE LOADED
        BY THE OPERATING CONTEXT -->
- <!-- CELLRENDERERS ARE TEMPLATES USED BY THE COMPONENTS
        FOR LAYOUT, DISPLAY AND RENDERING WITHIN THE OPERATING CONTEXT -->
- <!-- List CellRenderers -->
    <Class
        id="renderers.AddressDetail"
        package="[Path]components/cellrenderers/cellrenderers.swf" />
    <Class
        id="renderers.BlankRenderer"
        package="[Path]components/cellrenderers/cellrenderers.swf" />
    <Class
        id="renderers.CartItemRenderer"
        package="[Path]components/cellrenderers/cellrenderers.swf" />
    <Class
        id="renderers.ClickItemRenderer"
        package="[Path]components/cellrenderers/cellrenderers.swf" />
```

```
<Class
    id="renderers.CurrencyRenderer"
    package="[Path]components/cellrenderers/cellrenderers.swf" />
<Class
    id="renderers.DropDownButton"
    package="[Path]components/cellrenderers/cellrenderers.swf" />
<Class
    id="renderers.EmptyItemRenderer"
    package="[Path]components/cellrenderers/cellrenderers.swf" />
<Class
    id="renderers.LBI"
    package="[Path]components/cellrenderers/cellrenderers.swf" />
<Class
    id="renderers.MyStuffRenderer"
    package="[Path]components/cellrenderers/cellrenderers.swf" />
<Class
    id="renderers.TemplateRenderer"
    package="[Path]components/cellrenderers/cellrenderers.swf" />
<Class
    id="renderers.WalletRenderer"
    package="[Path]components/cellrenderers/cellrenderers.swf" />
- <!-- UI Components -->
<Class
    id="components.AdapterComponent"
    package="[Path]components/Components.swf" />
<Class
    id="components.Address" package="[Path]components/Components.swf" />
<Class
    id="components.AddressDetail" package="[Path]components/Components.swf"
    />
<Class
    id="components.Background" package="[Path]components/Components.swf" />
<Class
    id="components.BaseBar" package="[Path]components/Components.swf" />
<Class
    id="components.Checkbox" package="[Path]components/Components.swf" />
<Class
    id="components.CreditCardForm"
    package="[Path]components/Components.swf" />
<Class
    id="components.DropDown" package="[Path]components/Components.swf" />
<Class
    id="components.Hidden" package="[Path]components/Components.swf" />
<Class
    id="components.Input"
    package="[Path]components/Components.swf" />
<Class
    id="components.Label"
    package="[Path]components/Components.swf" />
<Class
    id="components.Line"
    package="[Path]components/Components.swf" />
<Class
    id="components.Link"
    package="[Path]components/Components.swf" />
<Class
    id="components.List2"
    package="[Path]components/Components.swf" />
<Class
    id="components.ListItem" package="[Path]components/Components.swf" />
<Class
    id="components.Radio"
    package="[Path]components/Components.swf" />
<Class
    id="components.SearchBar" package="[Path]components/Components.swf" />
<Class
    id="components.Space"
    package="[Path]components/Components.swf" />
<Class
    id="components.SpaceBar" package="[Path]components/Components.swf" />
<Class
    id="components.TabBar" package="[Path]components/Components.swf" />
<Class
    id="components.TabBar" package="[Path]components/Components.swf" />
<Class
    id="components.TitleBar" package="[Path]components/Components.swf" />
```

```
<Class
    id="components.Image"
    package="[Path]components/Components.swf" />
</Classmap>
```

Components—Plug-Ins, Built-Ins, and External Components

As described above, the User interface and operating environments supports the capability to dynamically reference, locate, and instantiate application components.

In some embodiments, an operating context specification causes the User interface to load or cause to be loaded the identified required components, including application components, built-in components, and external services, and fonts, skins, and related user interface components. An operating context specification may also define distributed workflow parameters, and associate specific components with portions of the workflow. The User interface implements the desired security model and session handling, including session isolation in order to provide privacy and trust shield features. Component specifications may be defined within the operating context specification, or alternatively, the operating context specification may specify one or more task maps that perform the specification of one or more desired components.

In more specific embodiments, an initial set of application components are available for the Active User interface. These comprise a operating context loader, a service resolver, a communication manager, and an application component loader.

In other embodiments, an operating context loader component instantiates a title expressed right processing environment or operating context on the basis of a operating context specification, as outlined herein.

In still other embodiments, a service resolver component uses service lookup techniques, including external service directories such as those provided by well known mechanisms such as UDDI and LDAP, service registries, and service lookup mechanisms provided by distributed component systems such as COM/DCOM and CORBA.

In yet other embodiments, a communication manager component implements communications between the User interface and one or more services. In some embodiments, the communication manager provides SOAP formatting, transmission, and retransmission services between the User interface and one or more services. The services may be provided on the same device as the communication manager, or may be provided on a different device.

In one embodiment, the communications manager component maintains connectivity and state for connections. An instance of a communications manager may communicate with more than one service. Specifically, a communications manager may simultaneously manage the communication with multiple DCEs, or different versions of services hosted on different servers.

Communications manager components may also utilize directory services by calling a service resolver component to resolve service locations and specifications.

According to some embodiments, an application component loader provides application component loading services, including downloading services to retrieve remotely stored application components, validation and verification services that ensure a component has not been tampered with and is authorized to execute, and optional task management services to control the execution of application components.

In some embodiments, a local instance of an identity management component is also provided. It is useful to have a local identity management component as part of the User interface for deployments where the User interface is not able to maintain regular communication with an external identity verification and authentication service. The identity management component that may be embedded within a user interface (or provided as another component) is used to validate components and operating context specifications. In one example embodiment, such an identity management component would cache and validate SAML assertions related to the validity of well defined components and specifications. The SAML assertions would be pre-stored in the cache for use when the User interface is not able to make an online connection to an identity verification source. The local instance of the identity management component may also be used to validate an initial or default operating context specification during User interface startup.

Components may use configuration information for defining their functionality, views, settings, and control. The configuration information may be defined locally, as part of a title expressed right processing environment, as part of an operating context, or defined as part of a network service. For example, a Wallet plug-in and components as described below may use configuration settings defined at the web site daxweb.org for looking up specifications for Credit Cards and Cash. These specifications indicate friendly names, locations for terms of use, icons, supported transactions, and controls for purchase. Examples of these configuration parameters are shown below:

```
<!DOCTYPE xsl:stylesheet (View Source for full doctype...)>
<CashCurrencyList>
    <CashCurrency cashValue="1.00"
    type="http://daxweb.org/ns/1.0/currency/cash/Navio/USD"
    symbol="$" ISO="USD" friendlyName=" Cash US$"
    touText="Navio Cash US$ Terms of Use" touLink="http://www.navio.com"
    purchaseAllowed="Credit" allowPin="0" />
    <CashCurrency cashValue="0.10"
    type="ttp://daxweb.org/ns/1.0/currency/cash/Navio/credits"
    friendlyName="Navio Credits"
```

```
    touText="Navio Credits Terms of Use" touLink="http://www.navio.com"
    purchaseAllowed=""
    allowPin="0" />
<CashCurrency cashValue="1.00"
    type="http://daxweb.org/ns/1.0/currency/cash/Fox/credits"
    symbol="$"
    ISO="USD"
    friendlyName="Fox Dollars"
    touText="Fox Dollars Terms of Use"
    touLink="http://foxsports-
    content.navio.com/storefront/termsofuse.xhtml"
    purchaseAllowed="Credit"
    allowPin="0" />
<CashCurrency
    cashValue="0.00"
    type="http://daxweb.org/ns/1.0/currency/cash/Fox/points"
    friendlyName="Fox Points"
    touText="Fox Rewards Page"
    touLink=http://foxsports-content.navio.com/storefront/termsofuse.xhtml
    baseContentLink="http://foxmusic.navio.com/"
    purchaseAllowed=""
    allowPin="0" />
</CashCurrencyList>
```

An initial set of components are available for the Active User interface:

| | |
|---|---|
| a. | Wallet |
| b. | Mobile wallet |
| c. | My Stuff (interface to Title Manager) |
| d. | Mobile "My Stuff" |
| e. | Contacts |
| f. | Settings |
| g. | Inbox |
| h. | Shopping Cart. (cross DCE) |
| i. | Cache |
| j. | Title trade/transfer |

A wallet component provides an interface to an external wallet service. This service may be present on a server, including a DCE server, or may be present as a device wallet present on a mobile device such as a mobile wallet built into a cell phone. Optionally, the wallet component may reference a wallet application present on a smart card.

A mobile wallet component provides an interface to a cache-backed wallet component. A mobile wallet component interacts with multiple wallet components to provide the wallet contents local to the device, and provides optional caching of wallet contents so the wallet contents are available without the underlying wallet service being immediately accessible to the device. The mobile wallet service coordinates with a cache service to ensure that the wallet materials are securely cached on the device, and with at least one connection manager to maintain synchronization between the cache and a remote wallet service's contents. In some cases, the mobile wallet component may encumber or otherwise obligate funds that have been moved to the cache on a mobile device. Wallet services supported by the mobile wallet component are described by the configuration information for the mobile wallet component.

Additional types of wallet components may be supported in a title expressed right processing environment. Additionally, wallet components may comprise at least one component. For example, wallet component may comprise a first component for handling digital cash, a second component for credit cards, a third component for interacting with ATM systems, and a fourth component for Carrier Billing. Additional components may be specified and loaded as required to provide the desired functionality. Each component can be dynamically loaded by the User interface within a specified rights management processing environment or operating context as required. The components can implement specific functionality required for the transaction, skin, flow, or other aspect of the system. For example, a digital cash component can allow the user to top-up an account. A second digital cash component can allow a user to top-up and send cash, or even cash-out. A Credit Card component can support various credit cards, types of credit cards, branding, issuer specifications, viewing, editing, updating and use. For example, a first Credit Card component can support Verified by Visa, while a second credit card component supports Visa viewing and use using CVV2 entry checks.

A "My Stuff" application component provides an interface to one or more title managers. In some cases, these title managers are present within differing DCE environments and may require different rights management processing environments or operating contexts. My Stuff components and associated components can be loaded within a specified rights management processing environment or operating context as required in a manner similar to a wallet components and other components described above. For example, a first My Stuff component can simply allow viewing of content purchased, including viewing and invoking of rights, while a second My Stuff component can support components that support playing and viewing of content such as a music and video player. This second type of My Stuff plugin can invoke other components within a title expressed rights processing environment or operating context in order to satisfy the specified end user interface play/view experience.

A mobile "My Stuff" component provides an interface to a cache-backed title manager interface component. A mobile "My Stuff" component may interact with one or more title manager interface components to provide a mobile device a local copy of contents provided by various title manager interface components. It provides optional caching of title manager interface contents so the title manager contents are available without the underlying title manager interface service(s) being immediately accessible to the device. The mobile "My Stuff" service coordinates with a cache service to ensure that the title manager materials are securely cached on the device, and with at least one connection manager to maintain synchronization between the cache and a remote title manager service's contents.

A contacts component provides a user interface user access to their personal profile information. A Contacts component also allows a user interface user access to their contacts that are stored as part of an external service, such as the Home, or within a cached version of their contacts. The User interface can allow a user to maintain a list of contacts and invoke rights on the contacts to make contact, update, edit, etc. The user can receive contact information in the User interface from another user using a "send contact" and "receive contact" right. This is similar to sending and receiving a business card. The contact information may be received in the "inbox" and accepted by the user where it is then stored and managed using the Contacts component. In one example, the contact information may be stored as Titles. In an alternate embodiment, the contact information may be stored as title expressed right content, and the Contacts component provides access to the title expressed right content using one or more Titles.

In addition, a contacts component may be configured to use local cache services. A contacts component may also be configured to use a mobile service, such as a mobile title manager, to store local copies of titles.

Contact information can also be created manually by the user, or even imported by the User interface from another contact management application such as Outlook or through SynchML.

A settings component provides a user interface user access to configure User interface and device settings related to User interface operation. For example, a user interface may provide a user the ability to specify a default operating context, or default operating context settings to use, when the User interface is started. Alternatively, a settings component may provide a mechanism for configuring settings related to one or more User interfaces. For example, a settings component may provide a mechanism for a user to configure a communications manager component.

A shopping cart component provides a user interface user the ability to maintain a shopping cart. In one embodiment, the shopping cart is device specific and may span more than one DCE or site. In an alternative embodiment, the shopping cart is associated with a specific DCE or site. Different shopping cart components may be constructed, including shopping carts that provide account-based and account-free checkouts. Account-free checkout is described below.

The User interface can store information locally and allow the user to review information as well as prepare transactions or complete their end of a transaction. An example implementation of the User interface utilizes a Flash uber-cookie as a temporary storage location. This technique allows the User interface to prepare an accountless checkout where the items are stored in a local shopping cart, user entered information is then entered, and the transaction is completed when a connection is made. The User interface may notify the user that the transaction is pending the establishment of a connection, and may optionally further notify the user after the transaction is completed. The caching can allow the User interface to recover from a disconnect and allow the user to continue with other activities until a connection is made.

Offline shopping cards can be supported by a shopping cart component, where items are added to the cart and saved for later use. Examples of later use include viewing and checkout. Another type of shopping cart component can support lists of items, such as wish-lists or gift registries, where the cart is saved and communicated to a group of family and friends that can view the cart, buy content using the cart, or take other title expressed right actions against cart contents. For example, a "send update" action may be specified in which an item in a cart may be purchased offline and the shopping cart updated to reflect the count of items actually purchased. Another function that can be supported by a cart component is that of multi-merchant checkout where a user interface user can shop at any number of online sites, adding items to the cart and then completing the checkout in one transaction. Additional components can be specified within shopping cart components for supporting checkout flows such as accountful and accountless, hard goods checkout, shipping, taxes, and even inventory checks.

A cache component provides an optionally secure cache usable by other application components. Specifically, caching may be implemented for title managers, identity managers, folders, inbox, settings, and contacts in order to reduce the interactions with a DCE and databases. Caching requires intelligence within the User interface components to handle cached data, refresh data, and understand when data has changed.

In one example embodiment, the cache is secured using cryptographic means and the cache component provides key management and cache read/write services. In other embodiments, the cache component provides an unsecured storage area in a device and relies on the tamper resistant nature of the device to protect the cache contents.

In some embodiments, the cache component may implement separate cache partitions, where individual components have their own virtual instance of the cache that is isolated from other components. The isolation may occur on a component, operating context, title expressed right processing environment, or other attribute basis. In other embodiments, there is single cache that is shared by all components, context, and environments. In some embodiments, access to the cache is a title expressed right operation that may be controlled using a title or other rights-management scheme.

A title trade/transfer component provides an interface to a title manager to permit a title to be traded or transferred between users or devices. In some embodiments, the title trade/transfer component directly communicates with one or more title manager or other DCE components in order to fulfill the trade/transfer of a title. In alternative embodiments, the title trade/transfer component provides a "mini-title manager" that performs a title transfer.

Display Panes

In a preferred embodiment, the User interface provides one or more display resources, called panes, to application components. In one embodiment, a pane may comprise a window in a windowing operating system. In an alternate embodiment, a pane may be part of a screen, or may comprise a drawing area of a larger window.

Figure 3A:
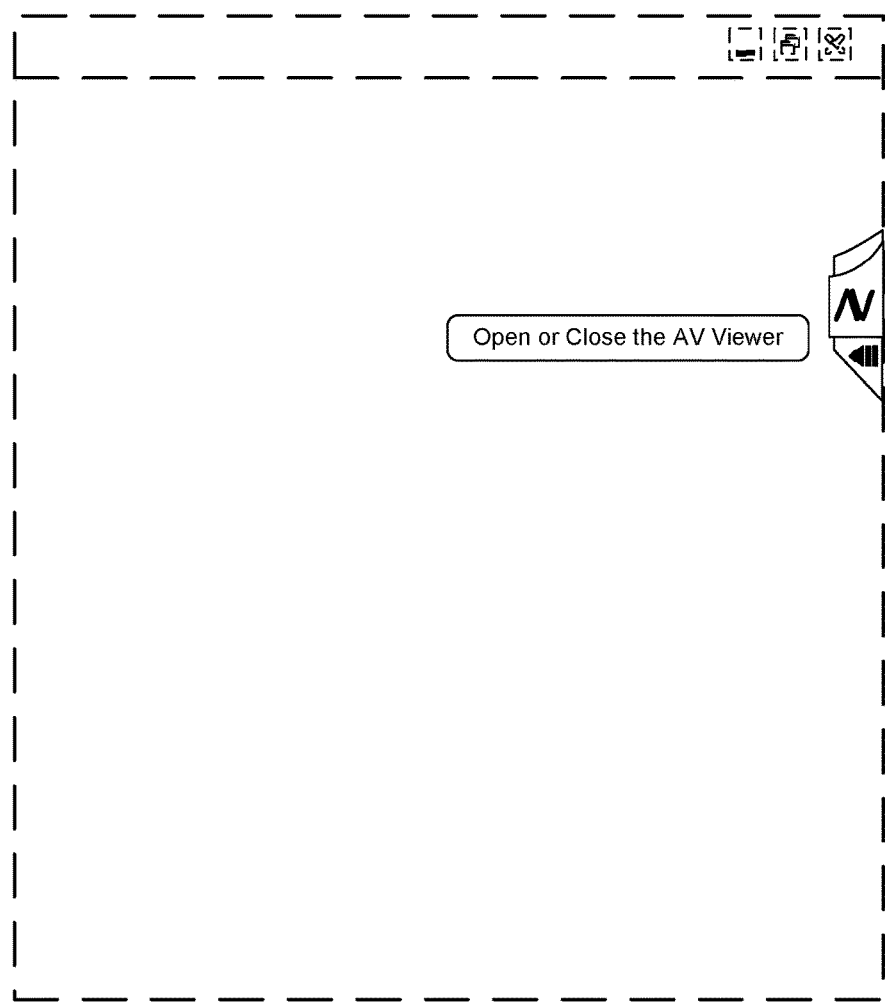
FIGS. 3a-3d illustrate an example of a user interface which facilitates interaction with title objects according to a specific embodiment of the invention.
Figure 3B:
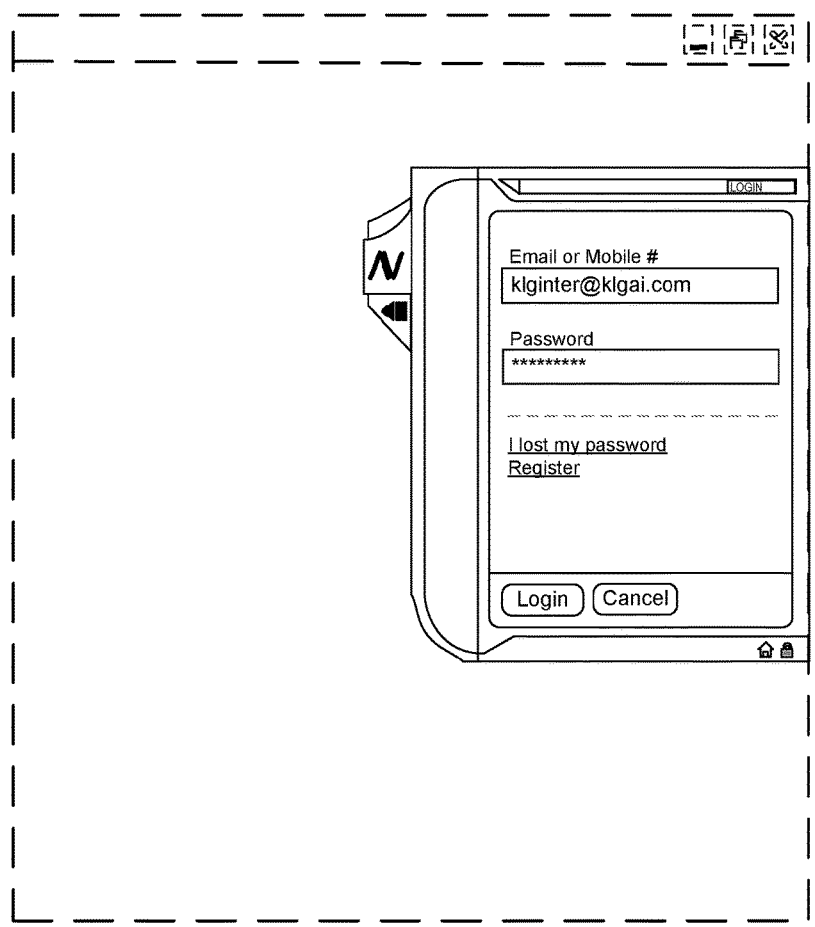
Figure 3C:
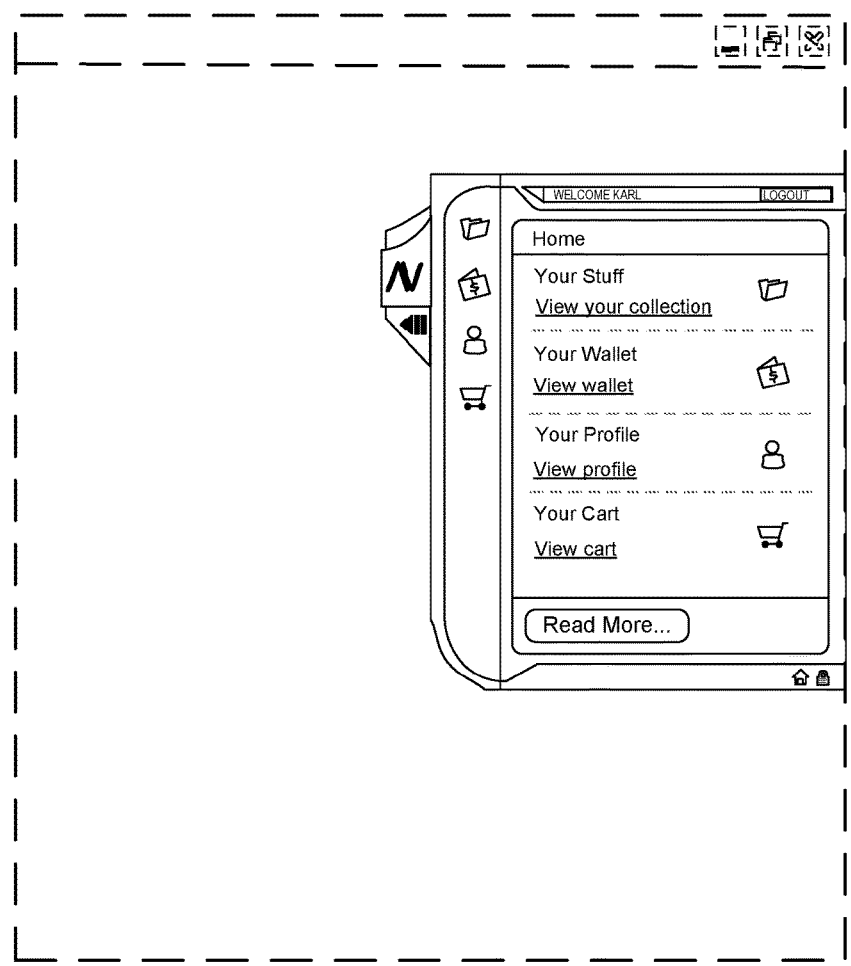
Figure 3D:
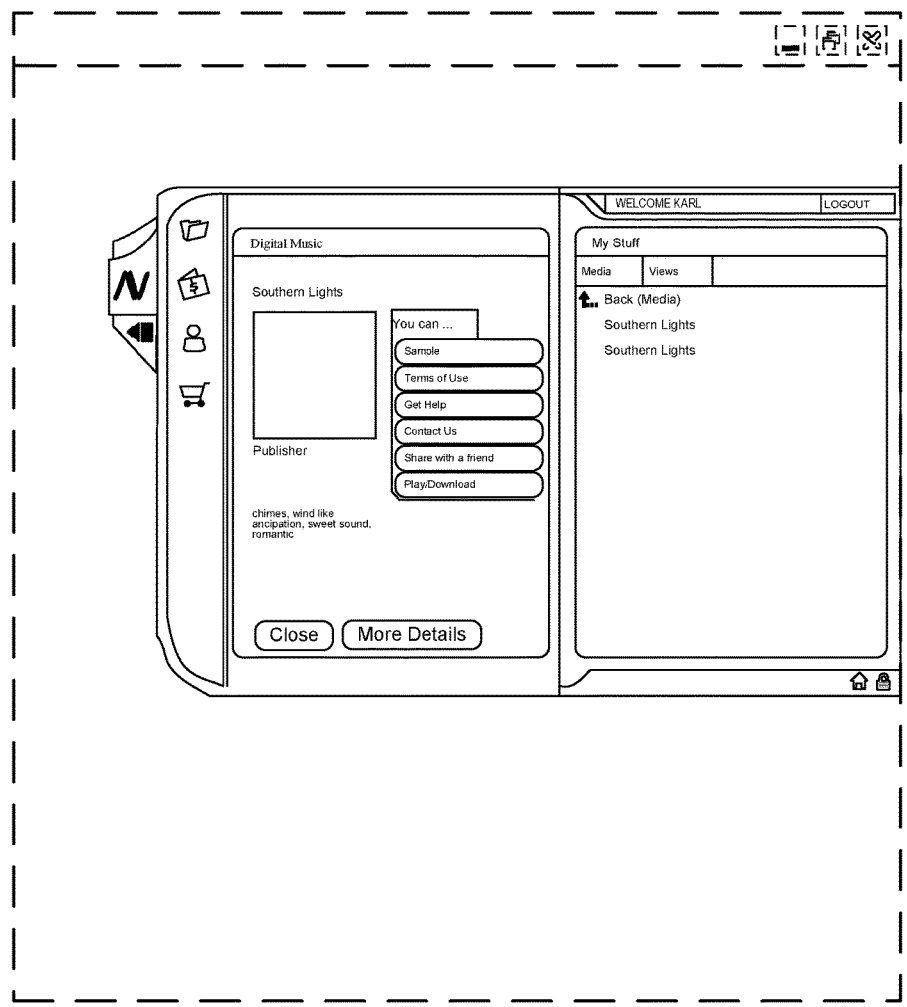

FIGS. 3a, 3b, 3c, and 3d illustrate an example of the User interface user interface, comprising multiple panes, a first pane which is displayed when the User interface user accesses the User interface (FIG. 3b, 3c), and a second pane which is made visible when the User interface user "pulls out" the drawer to expose additional content referenced by the first pane (FIG. 3d). The "drawer" may be "pulled out" or "pushed in" by the user, or may be optionally "pulled out" or "pushed in" under control of the User interface.

An operating context specification maps components, applications, the desired user interface look-and-feel (e.g. a skin), services, and service outputs to a specific display panes. In some embodiments, a controller component may be used to assist with mapping of these elements. In some cases, the controller component may be used to transform service outputs into a format usable within a operating context specification.

In some embodiments, specific panes are defined within the User interface. In the exemplary embodiment shown in the accompanying screen shots, the first pane is referred to as the "Primary" or "Main" pane, and the second pane is described as the "Drawer" pane.

Extensible features of the User interface also include the ability to define an operating context's look and feel using "skins" and to develop branded versions of the Active User interface that enable and/or disable specific features and component capabilities within each specific operating context.

Furthermore, a user interface may have its "look and feel" bound to it, so that it provides a specific look and feel when operating, or when operating within a specific web site and/or service. Alternatively, the look and feel may be bound when User interface is operating as a component in conjunction with a third party applications such as a music user interface. Alternatively, the User interface may take at least part of its look and feel from the configuration of the web site, service, or third party application to which it is bound. These bindings are effective either for the entire instance of the User interface, or for a specific display pane of the User interface.

For web sites, services, and third-party applications (collectively, a source) that are "User interface" aware, the source(s) may provide a specification (e.g. a operating context), a reference to a specification (e.g., a link to the operating context, skin, or style sheet), or the identification information of a specification (e.g. a operating context, skin, or style sheet search specification, or parameters to a search service) that specifies the desired components, bindings, and look and feel. Alternatively, a source may provide a unique identifier that the Active User interface maps to a defined configuration (e.g., an identifier for a provider of child content that defines a specific operating context, skin, or style sheet).

Finally, a title may provide a specification (e.g. a operating context), a reference to a specification (e.g., a link to the operating context, skin, or style sheet), or the identification information of a specification (e.g. a operating context, skin, or style sheet search specification, or parameters to a search service) that specifies the desired components, bindings, and look and feel desired. Alternatively, a title may provide a unique identifier that the Active User interface maps to a defined configuration (e.g., an identifier for a provider of child content that defines a specific operating context, skin, or style sheet) to be used when processing rights associated with that specific title.

Title Expressed Right Operations

This section describes example rights processing operations supported by the User interface.

Distributed Workflow

In some embodiments, a capability of the User interface architecture within a title expressed right processing environment is the definition and trusted implementation of a distributed workflow. This capability permits a workflow to be distributed between one or more services, where parts of the workflow specification describes a UI front end that defines actions, screens, and the UI look and feel associated with those screens and actions. The User interface uses these parts of the workflow specification to implement a title expressed right processing environment. A distributed workflow between a front end cart application and a set of backend cart services is shown below as an example.

First, the User interface loads and launches the cart application to run either as the main task or a "behind the scenes" task using information defined in a specific operating context (and embedded task map) to define the cart application to be run. In the task map example above, this described by the lines:

```
<Cart
    package="[TaskPath]Cart/cart.swf"
    view="[TaskPath]Cart/Cart.xml" />
```

The cart package (executable) is defined by the package definition, and is executed within the UI context defined by the view. The cart package is started and provides the defined cart UI in the defined pane (as defined by the view). When a user clicks on a "buy" link, the User interface receives information about the selected item, and the User interface uses the Cart class defined to add the item to the local instance of the shopping cart. Internally, the cart class calls AddToCart.

As defined in the task map (above), AddToCart defines an XML form, described by the MasterList.xml file. AddToCart calls the User interface for UI support to obtain this information. On a good response, User interface obtains the user's response. If the response was Ok, the Cart package then fires a Cartupdated event to let every listening component know the cart was updated. If the response was not Ok, a message is displayed to the user and the cart is not updated.

Once the cart has been updated, it instructs the User interface to update the pane with the updated cart information. After the user sees the changes, and clicks the "Checkout" button, the cart flow is returned to the cart application as defined by the following lines in the task map:

```
<CheckOut
    view="[TaskPath]Cart/Checkout.xml"
    package="[TaskPath]Cart/Cart.swf" />
```

Depending upon the state of the User interface, the state of the cart, and other factors, the Cart application then passes control to a helper application as described in the table below:

| Helper application | Comment | User interface Status |
|---|---|---|
| Checkout_Session | standard cart flow | User has a session during checkout |
| Checkout_Accountless | accountless flow | no session, box unset |
| Checkout_NoCookie | prompt for login | no session, box set and no save me |
| Checkout_Cookie | instant login | no session, box set and save me |

User Interface

In an example embodiment, the User interface provides an application user interface that comprises two panes. A first pane is provided as the main screen for the User interface, as shown in the accompanying screen shots. A second pane is provided for use with task-specific details. In one embodiment, the pane is displayed using a metaphor of a "pull out drawer". An example of the second pane in an extended pull-out drawer is shown in the accompanying screen shots. The pull-out drawer metaphor shows how the screen real estate may be changed based upon the amount and type of information to be displayed. The pull-out drawer is shown as pulling to the side, but may be alternately configured to pull out below, above, or to the right of the first pane's display. Additionally, a plurality of drawers may be provided, optionally pulling out on the same or different sides of the first pane.

In an example embodiment, plurality of panes may be used to display information related to specific content. In the example shown in the accompanying screen shots, a second pane in a pullout drawer is used as part of a title manager interface to display the workflow actions embodied within a specific title and to provide the user interface for the actions described within that title.

The User interface provides a "trust indication" that indicates that the User interface is in secure communication with its underlying services, and that the loaded display components have been verified and validated. The trust indicator preferably will take the form of a lock symbol, as is common on web browsers to indicate a secure connection, but may be any symbol that the user understands indicates that the processing is trusted.

As shown in the accompanying screen shots, an exemplary title's rights are presented to the user as a set of buttons that permit the exercise of each right in the "drawer" display pane. The user interface presented on this pane is dynamically generated from information present in a title and within the title expressed right operating environment.

The following example XML snippet lists some common elements, attributes and values that are included in each right specification present in a title:

```
<Right action="[action]" implementation="[implementation]">
    <Name>[name]</Name>
    <Description>[description]</Description>
    <Attributes>
        <Attribute name"visibility">visible</Attribute>
        <Attribute name"restriction">private</Attribute>
        <Attribute name"state">false</Attribute>
        <Attribute name"order">1</Attribute>
        <Attribute name"class">primary</Attribute>
    </Attributes>
    <Conditions>
        [Condition elements]
    </Conditions>
    <Events>
        [Event elements]
    </Events>
    <Properties>
        [Property elements]
    </Properties>
    <Input>
        [Input elements]
    </Input>
    <Service>
        [Service elements]
    </Service>
</Right>
```

The properties included in this example are:
1. The action attribute is unique.
2. The implementation attribute specifies the service or User interface component that implements the right. The values are one of "reserved|service|httpget". Reserved implementations reference built-in services or components and include methods such as buy, redeem, sample, and redeliver. The service implementations use a service and may have prerequisites. The httpget implementations are simple references to URLs.
3. The Name element is a friendly name for this right and may be displayed to the user in the User interface.
4. The Description element provides a friendly description of the right and may be displayed in the User interface.
5. The Attributes element provides optional, specific system properties associated with the right. These properties/attributes are:
   a) visibility is set to visible or hidden and will determine whether or not the user may see the right.
   b) restriction is set to public or private and will determine whether or not the method can be redeemed by anyone but the owner. Rights marked as private can only be redeemed by the owner.
   c) state is set to true or false and indicates to the remote content system whether a stateful session should be setup and maintained (for multiple access on a single redemption).
   d) order is set to a numeric value to determine the sort order that rights should be displayed to the user.
   e) class is set to primary or secondary to indicate the importance of the right and will determine how and where it is displayed to users in the User interface.
   f) The Conditions element contains a list of conditions that must be satisfied before the right can be redeemed. This includes conditions that must be enforced by the User interface as well as expressed and enforced by device specific implementations.
   g) The Events element contains a list of events that must be handled during the redemption of the right. For example, the OnBuyComplete event will execute the identified distributed workflow logic once a buy process has completed.
   h) The Properties element contains a list of properties that should be expressed by the right and used by the system(s) that handle the right. Properties are specific non-changeable values (i.e. constants) that are used during redemption of the right.
   i) The Input element contains a list of input values that must be provided before the right can be redeemed. Inputs are changeable values (i.e. variables) that are provided at runtime by the system or user redeeming the right.
   j) The Service element contains specific values as required to describe how, and by what distributed workflow process/endpoint the right will be implemented. The elements and values contained within the Service element depend on the implementation and examples are described below.

In such exemplary embodiments, the User interface associates specific rights present in the title with features of the UI. For example, a "Buy" right may specify a specific input that must be gathered, have specific prerequisites, and identifies a service that should be invoked in order to process the right. For example, a operating contexts style sheet may specify one or more style and layout elements that the right will be displayed in. In one example, the operating context may specify that rights described in a title are displayed in the "drawer" pane. The rights specification provides optional additional display guidance with its attributes, which includes positioning and display guidance. The User interface uses these attributes, along with UI specifications from the operating context, to construct portions of the user interface, including the name, description, layout, text, underlying User interface component, application component, or service to be called when this UI component is accessed for each portion of the UI. In some cases, these functions are handled by the Controller application component, or an external service. The resulting user interface may thus be dependent upon the specification contained within a specific title, as well as the specific title expressed right operating environment in use at a specific time. In some title expressed right operating environments, not all rights for a title may be displayed. Optionally, some rights may be displayed on alternate screens, or they may be hidden in scrolling areas of the UI.

An advantage of this approach is that the User interface provides improved support for rights-based commerce, where a user can operate within a specific rights-based operating environment. The operating environment may convey the desired look-and-feel to the user, down to providing mouse-over and context-sensitive help, and merge this information with the information provided for specific titles and rights.

The User interface, operating within the context of its title expressed right operating environment, may process at title by:
 a. selecting one or more rights from the title.
 b. optionally combining the rights information present in the title with additional information from the title
 c. optionally combining the above information with additional information from external sources.
 d. Using the combined information to render a user interface
 e. Processing the user interface by interacting with a user
 f. Executing a specified distributed workflow step on the basis of the interactions with the user.

Step a may be performed by selecting one or more rights from a specific title, and selecting some or all of them to be included in the UI. The selection may be based, in part, upon information provided with the rights in the title.

Step b may be performed by combining the selected rights information with additional information provided in the title, or using information referenced by the title. For example, the title may include a copy of approved graphics and description of the work represented by a title, or it may include a link to that information.

Step c may be performed by combining the aggregated information from external sources, such as information provided by a storefront, from the title expressed right operating environment, or from third-party sources.

Step d may be performed by applying the user interface specifications defined in a operating context, view, or stylesheet, and rendering a user interface on a specified display pane.

Step e may be performed by processing the user interface, collecting information that the user enters, and optionally verifying at least part of the information.

Step f may be performed by the User interface calling one or more specified User interface components or external services in accordance with a specified distributed workflow. An example of a specified distributed workflow is provided by the service element in a right specification, alternative distributed workflow specifications may be provided within the title expressed right operating environment specified by a operating context.

In one embodiment, the user selects a right they wish by clicking on a button presented in the user interface.

The mapping between a user interface component, application component, or external service and a specific button, as well as the button label, help definitions, and mouse-over text, is performed as described above.

Integration

In some embodiments, a user interface may be integrated with web sites and accessed from computing devices using standard Internet protocols including HTTP, HTTPS, and WAP. In some embodiments, the User interface may be launched from an existing web site by naming the User interface in a link, or by naming a user interface operating context in a link (which loads the User interface by association), by specifying it using a scripting language such as JavaScript, or by other means well known to those skilled in the art. A sample JavaScript application that integrates a flash-based User interface within a web site is provided below:

```
fixMozillaZIndex=true;
navioBrand | | (navioBrand = "Navio");
navioTheme | | (navioTheme = "Navio");
if (typeof(frameVersion) = = 'undefined') frameVersion = true;
////////////////////////////////////////////////////////
////////
// Define current version of the FlashPlayer
////////////////////////////////////////////////////////
////////
var flash=new Object( );
flash.installed=false;
flash.version='0.0';
if (navigator.plugins && navigator.plugins.length)
{
  for (x=0; x<navigator.plugins.length; x++)
  {
    if (navigator.plugins[x].name.indexOf('Shockwave Flash') != -1)
    {
      flash.version=navigator.plugins[x].description.split('Shockwave Flash ')[1];
      flash.installed=true;
      break;
    }
  }
} else if (window.ActiveXObject)
{
  try
  {
    oFlash=new ActiveXObject('ShockwaveFlash.ShockwaveFlash.1');
    if (oFlash)
    {
      flash.installed=true;
      flash.version=(oFlash.FlashVersion( )/65536)+'.0';
    }
  } catch(e) { }
}
// Check installed version from 2 to 10
for (var i=2; i<10; i++)
    flash["ver"+i]=flash.installed && parseInt(flash.version) >= i;
////////////////////////////////////////////////////////
////////
// /var domain =
(window.location+" ").split("//")[1].split("/").shift( ).split(":") [0];
var domain = DOMAIN;
if (domain = = " ") domain = "builder.navio.com";
function Navio ( )
{
      this.objName = "av";
      this.divName = "avDiv";
      this.avswf = "/tts/av/av.swf";
      this.senderswf = "/tts/av/JSConnector.swf";
      this.channel = (Math.random( )*1000);
this.wnd = window;
this.minWidth = 23;
this.behaviorModes = {
    IE: "ie",
    Netscape: "netscape",
    Safari: "safari"
};
      this.InternetExplorer = navigator.appName.indexOf("Internet Explorer") != -1;
      this.Netscape = navigator.appName.indexOf("Netscape") != -1;
      this.Firefox = navigator.userAgent.indexOf("Firefox") != -1;
```

-continued

```
        this.Safari = navigator.userAgent.indexOf("Safari") != -1;
        this.Mac = navigator.platform.indexOf("Mac") != -1;
        this.avMoving = this.Netscape?"js":"auto";
    this.behavior =
this.InternetExplorer?this.behaviorModes.IE:(this.Safari?this.behavior
Modes.Safari:this.behaviorModes.Netscape);
    this.insertAfterLoading = frameVersion &&
this.Netscape;//this.Firefox;
        this.snap = 4;
        this.scrollInterval = this.sizeInterval = -1;
        this.curWidth = (this.avMoving =="js")?this.minWidth:610;
        this.frameRate = parseInt(1000/48);
        this.postActivateCmd = null;
        this.avConnectorInsert = function(reset)
        {
            if(reset) {
            this.wnd.document.getElementById("senderDiv").outerHTML =
this.getSender( );
                this.avMainInsert(true);
            } else {
                this.wnd.document.write(this.getSender( ));
                this.avMainInsert( );
            }
        }
        this.avMainInsert = function(reset)
        {
            if(reset)
this.wnd.document.getElementById(this.divName).outerHTML = this.get(
);
            else document.write(this.get( ));
        }
        this.getSender = function( ){return '<div id="senderDiv"
name="senderDiv">'+this.getEmbed(' ')+'</div>'}
        this.getEmbed = function (vars){return '<EMBED
src="http://'+domain+this.senderswf+'?linkSuffix=' + this.channel +
(vars?('&' + vars):' ') + ' "WIDTH="1px" HEIGHT="1px"
swLiveConnect="true" AllowScriptAccess="Always" ID="Sender"
NAME="Sender" TYPE="application/x-shockwave-flash"
PLUGINSPAGE="http://www.macromedia.com/go/getflashplayer"
></EMBED>';}
        this.get = function( ) {return '<div id=" '+this.divName+' "
name=" '+this.divName+' "
style="width:'+this.curWidth+'px;right:0px;position:absolute;top:6px;z-
index:100">'+this.getInner( )+'</div>';}
        this.getInner = function( ) {return '<EMBED wmode="transparent"
flashVars=" '+this.getVars( )+' " '+' src="http://'+domain+this.avswf+' "
quality="high" scale="noscale" WIDTH=" '+this.curWidth+' " HEIGHT=
"425"salign="LT" ID=" '+this.objName+' " NAME=" '+this.objName+ '
"ALIGN="right"TYPE="application/x-shockwave-flash"
PLUGINSPAGE="http://www.macromedia.com/go/getflashplayer"
</EMBED>';}
        this.getVars = function( ) {return
"domain="+domain+"&brand="+navioBrand+"&theme="+navioTheme+"
&linkSuffix="+this.channel+(this.avMoving =="js"?"&alignment=
left":" ");}
        this.flush = function( )
        {
            this.channel = (Math.random( )*1000);
            this.avConnectorInsert(true);
        }
        this.hidemenu = function( )
        {
            if (this.avMoving=="js")
            {
                var avObj = this.getObj(this.objName);
                var div = this.getObj(this.divName);
                if (avObj==null || (div= =null && (this.behavior = =
this.behaviorModes.Safari)))
                {
                    clearInterval(this.scrollInterval);
                    return;
                }
                var sX = this.curWidth;
                var oX = parseFloat(avObj.style.width);
                !isNaN(oX) || (oX = 0);
                var pass = (sX-oX)/6;
                if (Math.abs(pass) < Navio.snap)
                {
                    if (this.behavior = = this.behaviorModes.Safari)
                        div.style.right= (this.curWidth-
this.minWidth)+"px";
                    avObj.style.width = this.curWidth+"px";
                    clearInterval(this.sizeInterval);
                    this.postActivate( );
                } else
                {
                    if (this.behavior = = this.behaviorModes.Safari)
                        div.style.right= (oX+pass-
this.minWidth)+"px";
                    avObj.style.width = oX+pass+"px";
                }
            } else this.postActivate ( );
        }
        this.movemenu = function( )
        {
            var div = this.getObj(this.divName);
            if (div= =null)
            {
                clearInterval(this.scrollInterval);
                return;
            }
            var loc = {x:parseFloat(div.style.right),
y:parseFloat(div.style.top)};
            var destination ={x:0,y:100};
            if (this.wnd.innerHeight) destination =
{x:this.wnd.pageXOffset, y:this.wnd.pageYOffset};
            else if (this.wnd.document.documentElement &&
this.wnd.document.documentElement.scrollTop) destination =
{x:this.wnd.document.documentElement.scrollLeft,
y:this.wnd.document.documentElement.scrollTop};
            else if (this.wnd.document.body) destination =
{x:this.wnd.document.body.scrollLeft,
y:this.wnd.document.body.scrollTop};
            else {
                alert("invalid destination in movemenu")
                return;
            }
            !isNaN(loc.x) || (loc.x=0);
            !isNaN(loc.y) || (loc.y=0);
            !isNaN(destination.x) || (destination.x=0);
            !isNaN(destination.y) || (destination.y=100);
//          var dif = {x:destination.x-loc.x, y:destination.y-loc.y};
//          if (Math.abs(dif.y) < this.snap) {
                switch (this.behavior)
                {
                    case this.behaviorModes.IE: div.style.right =
"1px"; div.style.right = "0px"; break;
                    case this.behaviorModes.Safari: div.style.right
= (this.curWidth-this.minWidth-parseInt(destination.x))+"px"; break;
                    default: div.style.right = (0-
parseInt(destination.x))+"px"; break;
                }
                div.style.top = parseInt(destination.y)+"px";
                clearInterval(this.scrollInterval);
/*
            } else {
                switch (this.behavior)
                {
                    case this.behaviorModes.IE: div.style.right =
"0px"; break;
                    case this.behaviorModes.Safari: div.style.right
= (this.curWidth-this.minWidth-destination.x-(dif.x/6))+"px"; break;
                    default: div.style.right = (0-
destination.x-(dif.x/6))+"px"; break;
                }
                div.style.top = destination.y-(dif.y/6)+"px";
            }
*/
        }
        this.postActivate = function( )
        {
            if (this.postActivateCmd != null)
this.send(this.postActivateCmd);
            this.postActivateCmd = null;
        }
        this.Buy = function(docId, qty, data) {
            if (Navio.Mac)
                alert("All digital music items are not available for
play or downloads on the Mac.\nShould you purchase this item, you must
```

-continued

```
download it on a Windows PC.\nYou can play it on any Windows Media
Player device that supports Windows DRM (except Windows Media
Player
for Mac OS X).");
        if (data = = = null | | data.indexOf("=") = = -1) data = null;
        this.activate("buy?docId="+escape(docId)+"&quantity=" +
(parseInt(qty) | |1) + (data != null ?
"&tag="+escape(this.removeMfngLegacy(data)) : " "));
    }
    this.Open = function(taskAlias)
{this.send("open?"+(taskAlias != null?taskAlias: " "));}
    this.Close = function( ) {this.send("close?"); }
    this.BuyCash = function(currency)
{this.activate("buyCash?"+(currency!=null?("buyCashCurrency="+
currency):" "))}
    this.BuyPin = function( )
{this.BuyCash("cash/MFNG/credits"); }
        this.LoginForward = function(url, target)
{this.activate("loginForward?url="+escape(url)+"&q="+escape(target));}
        this.ShowCart = function( ) {this.Open("Cart");}
        this.Survey = function(docId, src)
{this.activate("survey?id="+escape(docId)+"&survey="+escape(src));}
        ////////////////////////////////////////////////
///////
////////////////
    this.send = function (link) {
        var sender = document.getElementById ("senderDiv"); // Here
need use document . . . (not this.wnd.document) because Sender never
embed do inside page
        if (sender != null) sender.innerHTML =
Navio.getEmbed("sendValues="+escape(link));
    }
    this.activate = function (link) {
        if (typeof (link) = = 'undefined') link = null;
        if (this.avMoving= ="js") this.postActivateCmd = link;
        else if (link !=null) window.setTimeout
("Navio.send(' "+link+" )", 1500);
        this.Open( );
    }
    this.removeMfngLegacy = function (data) {
        var re = /mfng/g;
        return (data.replace(re, " "));
    }
    this.getObj = function (name)
    {
        // http://www.quirksmode.org/js/dhtmloptions.html
derivitive (removed class)
        if (this.wnd.document.getElementById) return
this.wnd.document.getElementById(name);
        if (this.wnd.document.all) return
this.wnd.document.all [name];
        if (this.wnd.document.layers) return
this.wnd.document.layers [name];
        return null;
    }
    this.insertav = function (w)
    {
        if (this.avMoving= ="js") this.curWidth = 23;
        this.wnd = w;
        w.document.body.innerHTML += this.get ( );
        w.Sender_DoFSCommand = Sender_DoFSCommand;
        w.onscroll = window.onscroll;
        w.onresize = window.onresize;
    }
}
//////////////////////////////////////////////////
///////
////////////////////////////////
Sender_DoFSCommand = function (command, args) {av_DoFSCommand
(command, args);};
av_DoFSCommand = function (command, args)
{
    switch (command)
    {
        case "resize":
            Navio.curWidth = parseFloat(args) | | 100;
            Navio.sizeInterval =
window.setInterval("Navio.hidemenu( )", Navio.frameRate);
            break;
        case "eval":
            eval(args);
            break;
        case "builderLogin":
        case "builderLogout":
            window.top.location = window.top.location;
            break;
    }
}
/*
function insertav(w) {
    if (!Navio.insertAfterLoading) return;
    if (Navio.avMoving= ="js") Navio.curWidth = 23;
    Navio.wnd = w;
    w.document.body.innerHTML += Navio.get ( );
    w.Sender_DoFSCommand = Sender_DoFSCommand;
    w.onscroll = window.onscroll;
    w.onresize = window.onresize;
}
*/
//////////////////////////////////////////////////
///////
//////////////////////////////
// WINDOW
function windowOnScroll( )
{
    clearInterval(Navio.scrollInterval)
    Navio.scrollInterval = setInterval("Navio.movemenu( )",
Navio.frameRate);
}
window.onscroll=windowOnScroll;
window.onresize=onscroll;
//////////////////////////////////////////////////
///////
////////////
// Latest Player ???
if (!flash.ver7) {
    if (confirm("This web site makes use of the latest Macromedia ®
Flash ™ software for important functions such as purchases. You have an
older \nversion of Macromedia Flash Player that will not allow you to
buy content.\n\nUpdate to the latest version now?"))
    {
        alert("Please close all other browser windows to avoid a
system reboot.\n\nPress OK when you are ready to proceed");
        window.top.location =
"http://"+domain+"/tts/av/fPopFlashInstall.htm?loc="+escape(window.
location);
    }
}
document.write('<SCRIPT LANGUAGE=JavaScript event="FSCommand
(command, args)" for="av"\> \n');
document.write('if(command) {\n');
document.write(' av_DoFSCommand(command, args);}\n');
document.write('</SCRIPT> \n');
document.write('<SCRIPT LANGUAGE=JavaScript event="FSCommand
(command, args)" for="Sender"\> \n');
document.write('if(command) {\n');
document.write(' Sender_DoFSCommand(command, args);}\n');
document.write('</SCRIPT> \n');
window.top.Navio = Navio = new Navio ( ); // Create Navio object
Navio.avConnectorInsert( );
Navio.Open( );
```

In some embodiments, an Active User interface may be partially deployed as a web browser plug-in that scans web pages and other content sources as they are loaded, watching for links that name a user interface, an operating context, or title. If an appropriate link is detected, the web browser plug-in rewrites the web page on the fly, adding the necessary scripting language (such as Javascript) to the web page to display the Active User interface indicator shown in the accompanying screen shots. The Active User interface indicator provides a visual indication to the user that a page is Active User interface aware.

In one embodiment, the Active User interface is provisioned with a list of web sites from which it is authorized to be launched. The Active User interface may, depending upon configuration, choose to not launch, launch in "insecure mode" (e.g. the trust indicator is not set), or may display a popup window indicating that the Active User interface is being inappropriately launched. In one example embodiment, the Active User interface may require a title to launch, said title may alternatively specify a operating context to be used.

The Active User interface may have third-party applications defined, either within the Active User interface or by use of an operating context specification and may link to these applications when so directed by a user. The linking and subsequent execution of these applications may be a title expressed right event, and be subject to a rights specification within a title or Active Voucher.

In an example embodiment, a merchant who has a right to run a user interface-Reporting service to generate a report of title-based usage of their electronic property may be provided this option upon the basis of a specific title or voucher they possess. The title or voucher may identify the specific service, or may identify a specific processing environment that includes the specified service. The user may specify the report they desire by making a service request within the specified processing environment. In the specific example, the user would click a button linked to a "Report" service provided by a user interface-Reporting server associated with a specific DCE. The user's rights as defined in the title may be used to further define the rights over the report content itself.

Alternatively, a specific title or operating context specification may specify specific third party applications, such as a music player, chat, IM, or VoIP service that should be executed when a specific right has been selected. The User interface may be used to enforce title-based access control to specific services and to mediate access to these services upon the basis of rights specified in one or more titles.

In some wireless and mobile environments, the Active User interface may be associated with a "wake-up" or other notification message. As one skilled in the art will recognize, wireless mobile environments may deliver a message to a mobile device as a "wake up" notification. These messages may be delivered using any of SMS or other messaging systems common to the wireless and mobile devices. The wake-up notification may include additional information, such as a specification for an application to respond to the notification using, a URI of a service to connect to, a operating context specification, and other information. The mobile device, upon receipt of the notification message, wakes up and uses a device specific application to connect to a network service in response to the notification. In an example embodiment, the mobile device may use a device-specific application, or an application specified in the wake-up message, to respond to the "wake up" message. In a particular example embodiment, the application used to respond to a wake-up message is the Active User interface. In an alternative example embodiment, the wake-up message may specify the Active User interface as the application to respond to the wake-up message.

In alternate embodiments, the 'wake-up' message may include a operating context specification, either embedded within the URI, or as an additional data element included in the message.

One method of implementing a plurality of wake-up message responders is described above, where the wake-up message specifies the desired responder. In other possible implementations, the device itself may make the wake-up responder determination. For example, the device may provide a selection mechanism in which the wake-up message responder application is determined upon the basis of at least one of: the sender of the wake-up message, at least some of the contents of the wake-up message, and device or user preferences stored in a profile in the device. Parameters to wake-up message responder application may be provided from the sender of the wake-up message, at least some of the contents of the wake-up message, and device or user preferences stored in a profile in the device. These parameters may include a operating context specification, a title, or other User interface recognized information.

An example implementation might include a device that starts the Active User interface to respond to a wake-up request from a specific sender or group of senders. Alternate implementation examples include recognizing a specific URI, or part of a URI in the wake-up message and making the selection of the User interface on that basis. A part of a URI might include a operating context specification in the address specification or in the URL parameters, as illustrated below:

https://mysite.com/first-operating context-reference/web-service.asp?my-operating context-name In a further illustrative example, the identification of URI or sender information may be made on the basis of information stored in the device (e.g. a list of known trusted sites).

In other implementation strategies, the Active User interface may not be invoked to respond to the wake-up message, but may respond to content being downloaded to the device. In a common usage, a wireless service provider sends a "wake-up" message to a mobile device, which then starts an application and downloads the file specified by the URI included in the wake-up message. The downloaded file may include specific content, such as ring-tones, video, application programs, or other device specific content. This content is often identified by content meta-data, such as file type, file extension, and MIME extensions. The mobile may monitor downloaded content and start the User interface user interface when content that matches a specific content type is downloaded to the device. For example, the Active User interface user interface may be started when a MIME type that identifies a title is downloaded. Alternatively, the Active User interface user interface may be started when a file with a specific file extension is downloaded. Furthermore, MIME encoding may additionally describe one of: a user interface operating context associated with the downloaded content, a user interface title name associated with the downloaded content, or a mime-type that is used to identify content that may be managed using an Active User interface. Some examples of the above-mentioned MIME-encoding techniques are provided below:

X—Operating context: 1234567890
X—Title: http://location-goes-here
X—Title: (body of title follows here)
X—Protected: (an example of a MIME flag)
Content type: X-navio/X-subtype It should be understood by those skilled in the art that the names and values of the MIME entries may be configured as part of the implementation without affecting the scope of disclosure. The above examples describe responding to a wake-up message may be equally applied to SMS, IM, or other messaging protocols on other computing devices such as desktop computers. The above examples of monitoring downloaded content for MIME information may be applied equally well to any situation in which MIME-specified content is available, including file downloads from the Internet.

Another example of invocation is the invocation of a right to contact customer support via an online chat. In this case, the right allows the user to invoke the contact right and runs a supporting plug-in that provides a chat interface with the user. A title provides the underlying right for contacting customer support, and specifies a operating context that specifies the look and feel of a chat or IM system. Alternatively, the operating context may specify using a customer preference for chat or IM application.

Privacy and Trust Shield

The User interface implements privacy and trust shields similarly using common features of the User interface. The User interface, in effect, becomes a trusted agent which implements the requirements and business process flows specified by various parties to a transaction. Supporting the trust model is the use of authenticated components, tamper resistance of the components and assemblies, process isolation, and other technologies described herein. In some embodiments, the User interface may visually indicate when the User interface is operating in a manner that the user may trusted the outcome. For example, the User interface may indicate visually, for example, by showing the recognized "lock" symbol, that it is processing a operating context within a trusted title expressed right processing environment. In this case, trust means that the operating context has been loaded and that all of the required verification tests such as checking digital signatures or checksums have been applied and have passed. In other examples, the User interface may be processing at a reduced level of trust and may indicate this by showing a different symbol, or no symbol at all. Differing levels of trust may be indicated using different symbols or other indicia.

Similarly, the User interface may indicate, either with the same or different symbol, that the User interface itself, a web site that the User interface is launched from, or specific content or titles themselves are trusted. A user interface may identify "trusted" web sites from web site content, from a list of known trusted web sites, or using other techniques understood to those in the art.

The User interface, in essence, serves along with the DCE, as a trusted intermediary that enforces business process flows in a distributed manner. It supports privacy, when desired, by isolating users from vendors by acting as a trusted third party agent that effects the desired transaction in isolation from each other, while validating to each that the defined processes are being faithfully and fairly followed. For example, a web merchant posts a piece of electronic content on a web site for sale, and User interface-enables the web site by posting a reference to a user interface along with a operating context specification that specifies that anonymous checkouts are permitted.

In some embodiments, the User interface may take one or more of the following steps to help ensure the validity of the transaction.
 a) Take receipt of the electronic content,
 b) Validate the electronic content
 c) Manage payment for the electronic content through a trusted intermediary
 d) Manage the provision of additional information (such as buyer name) to the merchant (if required).

In some cases, the User interface completes the transaction using an accountless checkout process like the one described herein, and then requests a DCE to escrow and subsequently transfer the content to the new owners, and to escrow and subsequently transfer the payment to the vendor. Depending upon application settings, a user interface may limit access to personally identifiable information about the user and may further enforce user preferences that require the use of third party escrow services that render the user anonymous to the merchant or other service provider.

In a similar example application of a User interface, a content provider permits the use of affiliate sites to sell their content. The User interface serves as trusted third party intermediary to enable commerce between an untrusted web site offering genuine content, and the payment mechanisms. The User interface becomes the proxy that takes the content title from the site, collects payment on behalf of the vendor, and facilitates the trusted exchange of payment and content using a DCE lockbox.

The User interface offered by the web site may be authenticated, either by methods described herein or, if provided as a link, authenticating the link as a link to a known trusted site and then loading trusted software from a trusted site. Alternatively, the User interface could have already been authenticated and used by the user, and a previously authenticated local instance of the User interface operated on the device. The user may visually determine if the User interface is authentic by looking for a trusted icon, or by using an alternative means such as requesting that the User interface itself be validated by the underlying operating system (if one is present). Alternatively, a user interface may optionally display its authentication credentials to the user upon request by the user.

The User interface may use its service interface to request additional services from DCE applications and may provide the front end UI to these services. For example, a merchant or publisher may use the User interface to manage and generate reports about their titles. The merchant's User interface may present a title that contains rights to generate specific reports to a merchant. The merchant may use the User interface to manage the title that contains these rights, and to request the reports from a service using the title as their evidence of the right to have and possess the newly generated report.

Accountless Checkout

According to some embodiments, the User interface application supports an "accountless" checkout service in addition to traditional account-based checkout models. In this model, a user interface user does not require an account in order to make a purchase.

The basic flow is outlined below:
 1. User clicks an Offer on a storefront (Any generic offer will do for this example).
 2. Offer is placed in shopping cart.
 3. User clicks checkout (and indicates that they do not have an existing account)
 4. User is prompted to enter a credit card (assuming a credit card purchase)
 5. User confirms purchase
 6. User gets a thank you page and a link to activate their account
 7. User optionally activates their account, and stores the account information.

1. The User interface sends a SOAP request to the Checkout web service. This service will coordinate all checkout activities on behalf of the User interface. The User interface sends the Shopping Cart information along with the Credit Card being used for purchase (or other purchase details such as that required for input on buy, carrier billing, etc.).

2. The Checkout service obtains an account to use with an identity provider service. In a first embodiment, the checkout service registers a new account with an Identity Provider service. Although it is "accountless" checkout, an account is created—it will just be an unassigned, single use account until a user interface user decides to activate it.

3. The Checkout service then invokes PurchaseTitles on behalf of the User interface to initiate the transaction and receive a Payment Slip.

4. The Checkout service then adds the Credit Card on behalf of the User interface to maintain a record of the Credit Card in the event the user activates their account.

5. The Checkout service then makes a SubmitPayment request on behalf of User interface. When this request is complete, the user receives a thank you page with a link that allows them to activate the account.

The user can optionally activate the account so that it can be reused for subsequent purchases. When they click on the "activation" link, the User interface shows a registration page and then sends an activation request to the new Identity Provider service. For this to happen, the Checkout service sends an account activation key back to the User interface in the checkout response. This key is sent to the Identity Provider to activate the account. Note, for security reasons, the account can only be activated as part of this checkout sequence. Once the user navigates away from the Thank You page, the account can no longer be activated. There may also be a time-to-live constraint placed on the activation request.

CONCLUSION

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method, comprising:
receiving a digital bearer instrument, the digital bearer instrument being a digital object expressing a right that is redeemable by presentation of the digital bearer instrument to a process operating in an operating environment configured to redeem digital bearer instruments, the digital bearer instrument identifying the operating environment;
responsive to identification of the operating environment by the digital bearer instrument, obtaining an operating context, the operating context being a data structure that specifies a plurality of operating components associated with the operating environment;
instantiating at least some of the operating environment components using the operating context, thereby generating an instance of the operating environment;
validating each of the instantiated operating environment components; and
processing the digital bearer instrument using the instantiated operating environment components, including:
validating the digital bearer instrument; and
responsive to validation of the digital bearer instrument, redeeming the right expressed by the digital bearer instrument.

2. The method of claim 1, wherein the digital bearer instrument also identifies the operating context.

3. The method of claim 2, wherein the digital bearer instrument includes an identifier that points to the operating context stored externally to the digital bearer instrument, the method further comprising retrieving the operating context using the identifier.

4. The method of claim 2, wherein the digital bearer instrument includes a portion of the operating context.

5. The method of claim 1, wherein the plurality of operating environment components comprise a plurality of integrity-verified components that cannot be undetectably altered, and wherein instantiating at least some of the operating environment components comprises instantiating one or more of the plurality of integrity-verified components using one or more digital signatures and/or manifests.

6. The method of claim 1, wherein the digital bearer instrument represents a second right and identifies a second operating environment, the method further comprising:
instantiating a second plurality of operating environment components according to a second operating context that specifies the second operating environment; and
processing the digital bearer instrument using the second plurality of operating environment components in connection with redemption of the second right.

7. The method of claim 1, wherein processing the digital bearer instrument using the instantiated operating environment components includes one or more of the instantiated operating environment components interoperating with an additional operating environment to facilitate redemption of the right.

8. The method of claim 7, wherein the additional operating environment is an unverified operating environment.

9. The method of claim 1, wherein instantiating at least some of the operating environment components comprises instantiating all of the operating environment components and using the operating environment components as needed to process the digital bearer instrument.

10. The method of claim 1, wherein instantiating at least some of the operating environment components comprises instantiating the operating environment components as needed to process the digital bearer instrument.

11. The method of claim 10, further comprising unloading each instantiated operating environment component after it has been used.

12. The method of claim 1, wherein instantiating at least some of the operating environment components comprises instantiating one or more of (1) a user interface, (2) a verifier configured to verify integrity of any of the operating environment components, (3) a directory, (4) a state process that includes an entry for each digital bearer instrument that indicates validity of the corresponding digital bearer instrument when the entry is synchronized with state information associated with the corresponding digital bearer instrument, (5) a manager configured to facilitate management of a set of digital bearer instruments by a corresponding user, (6) a publisher configured to generate digital bearer instruments, or (7) a resolver configured to facilitate redemption of the rights associated with digital bearer instruments.

13. The method of claim 1, wherein processing the digital bearer instrument using the instantiated operating environment components includes one or more of the instantiated operating environment components interoperating with a verified computing platform and an unverified computing platform intervening between the operating environment and the verified computing platform.

14. A system, comprising one or more computing devices configured to:

receive a digital bearer instrument, the digital bearer instrument being a digital object expressing a right that is redeemable by presentation of the digital bearer instrument to a process operating in an operating environment configured to redeem digital bearer instruments, the digital bearer instrument identifying the operating environment;

responsive to identification of the operating environment by the digital bearer instrument, obtain an operating context, the operating context being a data structure that specifies a plurality of operating components associated with the operating environment;

instantiate at least some of the operating environment components using the operating context, thereby generating an instance of the operating environment;

validate each of the instantiated operating environment components; and process the digital bearer instrument using the instantiated operating environment components, processing of the digital bearer instrument including:
   validating the digital bearer instrument; and
   responsive to validation of the digital bearer instrument, redeeming the right expressed by the digital bearer instrument.

15. The system of claim 14, wherein the digital bearer instrument also identifies the operating context.

16. The system of claim 15, wherein the digital bearer instrument includes an identifier that points to the operating context stored externally to the digital bearer instrument, and wherein the one or more computing devices are further configured to retrieve the operating context using the identifier.

17. The system of claim 15, wherein the digital bearer instrument includes a portion of the operating context.

18. The system of claim 14, wherein the plurality of operating environment components comprise a plurality of integrity-verified components that cannot be undetectably altered, and wherein the one or more computing devices are configured to instantiate at least some of the operating environment components by instantiating one or more of the plurality of integrity-verified components using one or more digital signatures and/or manifests.

19. The system of claim 14, wherein the digital bearer instrument represents a second right and identifies a second operating environment, and wherein the one or more computing devices are further configured to:
   instantiate a second plurality of operating environment components according to a second operating context that specifies the second operating environment; and
   process the digital bearer instrument using the second plurality of operating environment components in connection with redemption of the second right.

20. The system of claim 14, wherein the one or more computing devices are configured to process the digital bearer instrument using the instantiated operating environment components by one or more of the instantiated operating environment components interoperating with an additional operating environment to facilitate redemption of the right.

21. The system of claim 20, wherein the additional operating environment is an unverified operating environment.

22. The system of claim 14, wherein the one or more computing devices are configured to instantiate at least some of the operating environment components by instantiating all of the operating environment components and using the operating environment components as needed to process the digital bearer instrument.

23. The system of claim 14, wherein the one or more computing devices are configured to instantiate at least some of the operating environment components by instantiating the operating environment components as needed to process the digital bearer instrument.

24. The system of claim 23, wherein the one or more computing devices are further configured to unload each instantiated operating environment component after it has been used.

25. The system of claim 14, wherein instantiating at least some of the operating environment components comprises instantiating one or more of (1) a user interface, (2) a verifier configured to verify integrity of any of the operating environment components, (3) a directory, (4) a state process that includes an entry for each digital bearer instrument that indicates validity of the corresponding digital bearer instrument when the entry is synchronized with state information associated with the corresponding digital bearer instrument, (5) a manager configured to facilitate management of a set of digital bearer instruments by a corresponding user, (6) a publisher configured to generate digital bearer instruments, or (7) a resolver configured to facilitate redemption of the rights associated with digital bearer instruments.

26. The system of claim 14, wherein processing the digital bearer instrument using the instantiated operating environment components includes one or more of the instantiated operating environment components interoperating with a verified computing platform and an unverified computing platform intervening between the operating environment and the verified computing platform.

\* \* \* \* \*